US011431394B2

(12) United States Patent
Bhattad et al.

(10) Patent No.: US 11,431,394 B2
(45) Date of Patent: Aug. 30, 2022

(54) CHANNEL QUALITY INDICATOR DESIGN FOR ENHANCED MACHINE-TYPE-COMMUNICATIONS

(71) Applicant: Qualcomm Incorporated, San Diego, CA (US)

(72) Inventors: Kapil Bhattad, Bangalore (IN); Alberto Rico Alvarino, San Diego, CA (US); Gowrisankar Somichetty, Bangalore (IN); Shashidhar Vummintala, Bangalore (IN); Hao Xu, Beijing (CN)

(73) Assignee: Qualcomm Incorporated, San Diego, CA (US)

( * ) Notice: Subject to any disclaimer, the term of this patent is extended or adjusted under 35 U.S.C. 154(b) by 127 days.

(21) Appl. No.: 16/476,593

(22) PCT Filed: Jan. 19, 2018

(86) PCT No.: PCT/US2018/014477
§ 371 (c)(1),
(2) Date: Jul. 9, 2019

(87) PCT Pub. No.: WO2018/144245
PCT Pub. Date: Aug. 9, 2018

(65) Prior Publication Data
US 2019/0349055 A1 Nov. 14, 2019

(30) Foreign Application Priority Data
Feb. 1, 2017 (IN) .............................. 201741003708

(51) Int. Cl.
*H04B 7/06* (2006.01)
*H04W 8/22* (2009.01)
(Continued)

(52) U.S. Cl.
CPC ......... *H04B 7/0632* (2013.01); *H04B 7/0639* (2013.01); *H04B 7/0641* (2013.01);
(Continued)

(58) Field of Classification Search
None
See application file for complete search history.

(56) References Cited

U.S. PATENT DOCUMENTS 9,877,271 B2 * 1/2018 Su ........................ H04W 48/16
2009/0168914 A1 * 7/2009 Chance ................ H04B 7/0874
375/267

(Continued)

FOREIGN PATENT DOCUMENTS

EP  2 541 988 A1  1/2013
EP   2541988 A1  1/2013

OTHER PUBLICATIONS

International Search Report and Written Opinion—PCT/US2018/014477—ISA/EPO—dated Sep. 19, 2018.
(Continued)

*Primary Examiner* — Nicholas Sloms
(74) *Attorney, Agent, or Firm* — Shankar Krithivasan

(57) ABSTRACT

Methods, systems, and devices for wireless communication are described. A user equipment (UE) may monitor a first control channel in a first frequency band. The UE may determine that a bandwidth capability of the UE supports communicating on the first frequency band and at least a second frequency band. The UE may perform a channel measurement procedure on the first frequency band and the second frequency band concurrently. The UE may transmit a channel feedback message including information associated with the channel measurement procedure.

34 Claims, 13 Drawing Sheets

(51) Int. Cl.
H04W 24/10 (2009.01)
H04W 28/20 (2009.01)
H04W 72/04 (2009.01)

(52) U.S. Cl.
CPC ............ *H04W 8/22* (2013.01); *H04W 24/10* (2013.01); *H04W 28/20* (2013.01); *H04W 72/0453* (2013.01)

(56) References Cited

U.S. PATENT DOCUMENTS

| | | | | |
|---|---|---|---|---|
| 2013/0072189 | A1* | 3/2013 | Cheng | H04B 7/0452 455/436 |
| 2013/0286964 | A1* | 10/2013 | Chu | H04L 5/0035 370/329 |
| 2015/0124638 | A1* | 5/2015 | Sun | H04L 1/0036 370/252 |
| 2015/0334730 | A1 | 11/2015 | Wakabayashi et al. | |
| 2016/0021661 | A1* | 1/2016 | Yerramalli | H04W 16/14 370/329 |
| 2016/0234707 | A1* | 8/2016 | Kazmi | H04W 76/28 |
| 2016/0302230 | A1* | 10/2016 | Novlan | H04J 11/0023 |
| 2016/0323901 | A1* | 11/2016 | Yum | H04L 5/0057 |
| 2016/0337893 | A1 | 11/2016 | Gheorghiu et al. | |
| 2018/0167948 | A1* | 6/2018 | Egner | H04W 76/16 |
| 2018/0212739 | A1* | 7/2018 | Kim | H04L 1/06 |

OTHER PUBLICATIONS

Partial International Search Report—PCT/US2018/014477—ISA/EPO—dated Jun. 6, 2018.

* cited by examiner

CHANNEL QUALITY INDICATOR DESIGN FOR ENHANCED MACHINE-TYPE-COMMUNICATIONS

CROSS REFERENCES

The present application is a 371 national phase filing of International Application No. PCT/US2018/014477 to Bhattad et al., entitled "CHANNEL QUALITY INDICATOR DESIGN FOR ENHANCED MACHINE-TYPE-COMMUNICATIONS", filed Jan. 19, 2018, which claims priority to Indian Application No. 201741003708 to Bhattad et al., entitled "CHANNEL QUALITY INDICATOR DESIGN FOR ENHANCED MACHINE-TYPE-COMMUNICATIONS", filed Feb. 1, 2017, each of which is assigned to the assignee hereof.

The present Application for Patent claims priority to Indian Patent Application No. 201741003708 by Bhattad et al., entitled "Channel Quality Indicator Design For Enhanced Machine-Type-Communications," filed Feb. 1, 2017; assigned to the assignee hereof.

BACKGROUND

The following relates generally to wireless communication, and more specifically to channel quality indicator design for enhanced machine-type-communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Some wireless communication systems may support communications between base stations and different types of narrowband device types. For example, in enhanced machine-type-communications (eMTC) and narrowband-Internet of Things (NB-IoT) deployments, mobile devices may communicate with a base station (or other serving station) using resources allocated specifically for one deployment or the other. Such systems may be associated with, for example, bandwidth (or frequency band) configurations that are designed to minimize power usage of the narrowband devices, are responsive to narrowband devices typically having a limited amount of information to communicate, etc.

In sonic aspects, some wireless communication systems supporting narrowband communication configurations, such as NB-IoT and eMTC, may have different available bandwidths for different types of channels used for communication. As one non-limiting example, such wireless communication systems may have one bandwidth (or frequency band(s)) available for the wireless devices to monitor certain channels (e.g., control channels) and a different bandwidth (or frequency band(s)) available for the wireless devices to exchange data (e.g., in a data channel). There may be instances, however, when a wireless device that supports communicating on wider bandwidths (or additional frequency bands) may benefit from accessing the wider bandwidth capability to perform certain functions, e.g., monitoring other channels, reporting channel quality indicator (CQI) messages, etc. Accordingly, aspects of the present disclosure provide for CQI design for eMTC communications that increase flexibility for certain device types.

SUMMARY

The described techniques relate to improved methods, systems, devices, or apparatuses that support CQI design for eMTC. Generally, the described techniques provide for a UE, such as an eMTC configured UE, to perform channel measurements in a wireless communication system supporting narrowband communication configurations. Broadly, the UE may determine which narrowbands to perform channel measurement procedures on based on a variety of configurations. As on example configuration, the UE may perform channel measurements on sub-carrier(s) that the TIE is monitoring a first frequency band on, e.g., on sub-carriers associated with the narrowband that the UE is monitoring the control channel on. As another example configuration, the UE may perform channel measurements on sub-carrier(s) that the UE is monitoring a first frequency band on and sub-carriers on a second frequency band that the UE is communicating on, e.g., on sub-carriers associated with the narrowband that the UE is monitoring the control channel on as well as sub-carrier(s) associated with narrowband(s) that the UE is receiving a data transmission on, in a third example configuration, the UE may autonomously determine to perform channel measurements on sub-carriers in a second frequency band that is outside of the sub-carrier (s) that the UE is monitoring a first frequency band on, e.g., on sub-carriers associated with the narrowband that the UE is monitoring the control channel on as well as sub-carrier(s) in other narrowbands.

A method of wireless communication is described. The method may include monitoring, by a wireless device, a first control channel in a first frequency band, determining that a bandwidth capability of the wireless device supports communicating on the first frequency band and at least a second frequency band, performing a channel measurement procedure on the first frequency band and the second frequency band concurrently, and transmitting a channel feedback message comprising information associated with the channel measurement procedure.

An apparatus for wireless communication is described. The apparatus may include means for monitoring, by a wireless device, a first control channel in a first frequency band, means for determining that a bandwidth capability of the wireless device supports communicating on the first frequency band and at least a second frequency band, means for performing a channel measurement procedure on the first frequency band and the second frequency band concurrently, and means for transmitting a channel feedback message comprising information associated with the channel measurement procedure.

Another apparatus for wireless communication is described. The apparatus may include a processor, memory in electronic communication with the processor, and instructions stored in the memory. The instructions may be operable to cause the processor to monitor, by a wireless device, a first control channel in a first frequency band, determine that a bandwidth capability of the wireless device supports communicating on the first frequency band and at least a second frequency band, perform a channel measurement procedure on the first frequency band and the second frequency band concurrently, and transmit a channel feedback message comprising information associated with the channel measurement procedure.

A non-transitory computer readable medium for wireless communication is described. The non-transitory computer-readable medium may include instructions operable to cause a processor to monitor, by a wireless device, a first control channel in a first frequency band, determine that a bandwidth capability of the wireless device supports communicating on the first frequency band and at least a second frequency band, perform a channel measurement procedure on the first frequency band and the second frequency band concurrently, and transmit a channel feedback message comprising information associated with the channel measurement procedure.

In some examples of the method, apparatus, and non-transitory computer-readable medium described above, the second frequency band may be larger than the first frequency band and includes the first frequency band.

Some examples of the method, apparatus, and non-transitory computer-readable medium described above may further include processes, features, means, or instructions for autonomously determining, by the wireless device, to perform the channel measurement procedure on the first frequency band and the second frequency band.

Some examples of the method, apparatus, and non-transitory computer-readable medium described above may further include processes, features, means, or instructions for receiving a configuration message conveying a channel measurement request. Some examples of the method, apparatus, and non-transitory computer-readable medium described above may further include processes, features, means, or instructions for performing the channel measurement procedure on the first frequency band and the second frequency band based at least in part on the configuration message.

Some examples of the method, apparatus, and non-transitory computer-readable medium described above may further include processes, features, means, or instructions for identifying a portion of subframes from a plurality of subframes to perform the channel measurement procedure. Some examples of the method, apparatus, and non-transitory computer-readable medium described above may further include processes, features, means, or instructions for performing the channel measurement procedure on the first frequency band and the second frequency band during the identified portion of subframes.

Some examples of the method, apparatus, and non-transitory computer-readable medium described above may further include processes, features, means, or instructions for identifying a preconfigured set of frequency bands, wherein the first and second frequency bands may be included in the preconfigured set of frequency bands.

Some examples of the method, apparatus, and non-transitory computer-readable medium described above may further include processes, features, means, or instructions for identifying a set of frequency bands that may be adjacent to the first frequency band, wherein the second frequency band may be included in the set of frequency bands.

In some examples of the method, apparatus, and non-transitory computer-readable medium described above, the channel feedback message comprises one or more of a full bandwidth CQI, a best bandwidth indicator, a bandwidth differential, CQI, a subband report, a precoding matrix indicator (PMI), or combinations thereof.

Some examples of the method, apparatus, and non-transitory computer-readable medium described above may further include processes, features, means, or instructions for increasing a number of bits in channel feedback message to carry the contents of the channel feedback message.

Some examples of the method, apparatus, and non-transitory computer-readable medium described above may further include processes, features, means, or instructions for determining a set of wideband frequency bands associated with the wireless device monitoring a control channel. Some examples of the method, apparatus, and non-transitory computer-readable medium described above may further include processes, features, means, or instructions for selecting the first and second frequency bands that may be within the wideband frequency bands.

In some examples of the method, apparatus, and non-transitory computer-readable medium described above, the channel measurement procedure may be performed according to a periodic schedule or an aperiodic schedule.

In some examples of the method, apparatus, and non-transitory computer-readable medium described above, the first frequency band comprises a 1.4 megahertz (MHz) bandwidth.

In some examples of the method, apparatus, and non-transitory computer-readable medium described above, the bandwidth associated with the second frequency band comprises one of a 5 bandwidth or a 20 MHz bandwidth.

A method of wireless communication is described. The method may include receiving, at a wireless device, a scheduling indicator on a first control channel in a first frequency band, determining that a data transmission is scheduled for the wireless device based at least in part on the received scheduling indicator, identifying a second frequency band associated with the data transmission, and performing, based at least in part on the identified second frequency band, a channel measurement procedure on the second frequency band.

An apparatus for wireless communication is described. The apparatus may include means for receiving, at a wireless device, a scheduling indicator on a first control channel in a first frequency band, means for determining that a data transmission is scheduled for the wireless device based at least in part on the received scheduling indicator, means for identifying a second frequency band associated with the data transmission, and means for performing, based at least in part on the identified second frequency band, a channel measurement procedure on the second frequency band.

Another apparatus for wireless communication is described. The apparatus may include a processor, memory in electronic communication with the processor, and instructions stored in the memory. The instructions may be operable to cause the processor to receive, at a wireless device, a scheduling indicator on a first control channel in a first frequency band, determine that a data transmission is scheduled for the wireless device based at least in part on the received scheduling indicator, identify a second frequency band associated with the data transmission, and perform, based at least in part on the identified second frequency band, a channel measurement procedure on the second frequency band.

A non-transitory computer readable medium for wireless communication is described. The non-transitory computer-readable medium may include instructions operable to cause a processor to receive, at a wireless device, a scheduling indicator on a first control channel in a first frequency band, determine that a data transmission is scheduled for the wireless device based at least in part on the received scheduling indicator, identify a second frequency band associated with the data transmission, and perform, based at least in part on the identified second frequency band, a channel measurement procedure on the second frequency band.

Some examples of the method, apparatus, and non-transitory computer-readable medium described above may further include processes, features, means, or instructions for transmitting a channel feedback message comprising information associated with the channel measurement procedure.

In some examples of the method, apparatus, and non-transitory computer-readable medium described above, the channel feedback message comprises one or more of a full bandwidth CQI, a best bandwidth indicator, a bandwidth differential, CQI, a subband report, a PMI, or combinations thereof.

Some examples of the method, apparatus, and non-transitory computer-readable medium described above may further include processes, features, means, or instructions for autonomously determining, by the wireless device, to perform the channel measurement procedure on the second frequency band.

Some examples of the method, apparatus, and non-transitory computer-readable medium described above may further include processes, features, means, or instructions for receiving a configuration message conveying a channel measurement request. Some examples of the method, apparatus, and non-transitory computer-readable medium described above may further include processes, features, means, or instructions for performing the channel measurement procedure on the second frequency band based at least in part on the configuration message.

Some examples of the method, apparatus, and non-transitory computer-readable medium described above may further include processes, features, means, or instructions for identifying a portion of subframes from a plurality of subframes to perform the channel measurement procedure. Some examples of the method, apparatus, and non-transitory computer-readable medium described above may further include processes, features, means, or instructions for performing the channel measurement procedure on the second frequency band during the identified portion of subframes.

Some examples of the method, apparatus, and non-transitory computer-readable medium described above may further include processes, features, means, or instructions for identifying a preconfigured set of frequency bands, wherein the first and second frequency bands may be included in the preconfigured set of frequency bands.

Some examples of the method, apparatus, and non-transitory computer-readable medium described above may further include processes, features, means, or instructions for identifying a set of frequency bands that may be adjacent to the first frequency band, wherein the second frequency band may be included in the set of frequency bands.

Some examples of the method, apparatus, and non-transitory computer-readable medium described above may further include processes, features, means, or instructions for determining a set of wideband frequency bands associated with the wireless device monitoring a control channel. Some examples of the method, apparatus, and non-transitory computer-readable medium described above may further include processes, features, means, or instructions for selecting the first and second frequency bands that may be within the wideband frequency bands.

in some examples of the method, apparatus, and non-transitory computer-readable medium described above, the channel measurement procedure may be performed according to a periodic schedule or an aperiodic schedule.

In some examples of the method, apparatus, and non-transitory computer-readable medium described above, the first frequency band comprises a 1.4 MHz bandwidth.

In some examples of the method, apparatus, and non-transitory computer-readable medium described above, the second frequency band comprises one of a 5 MHz bandwidth or a 20 MHz bandwidth.

DETAILED DESCRIPTION

Figure 1:
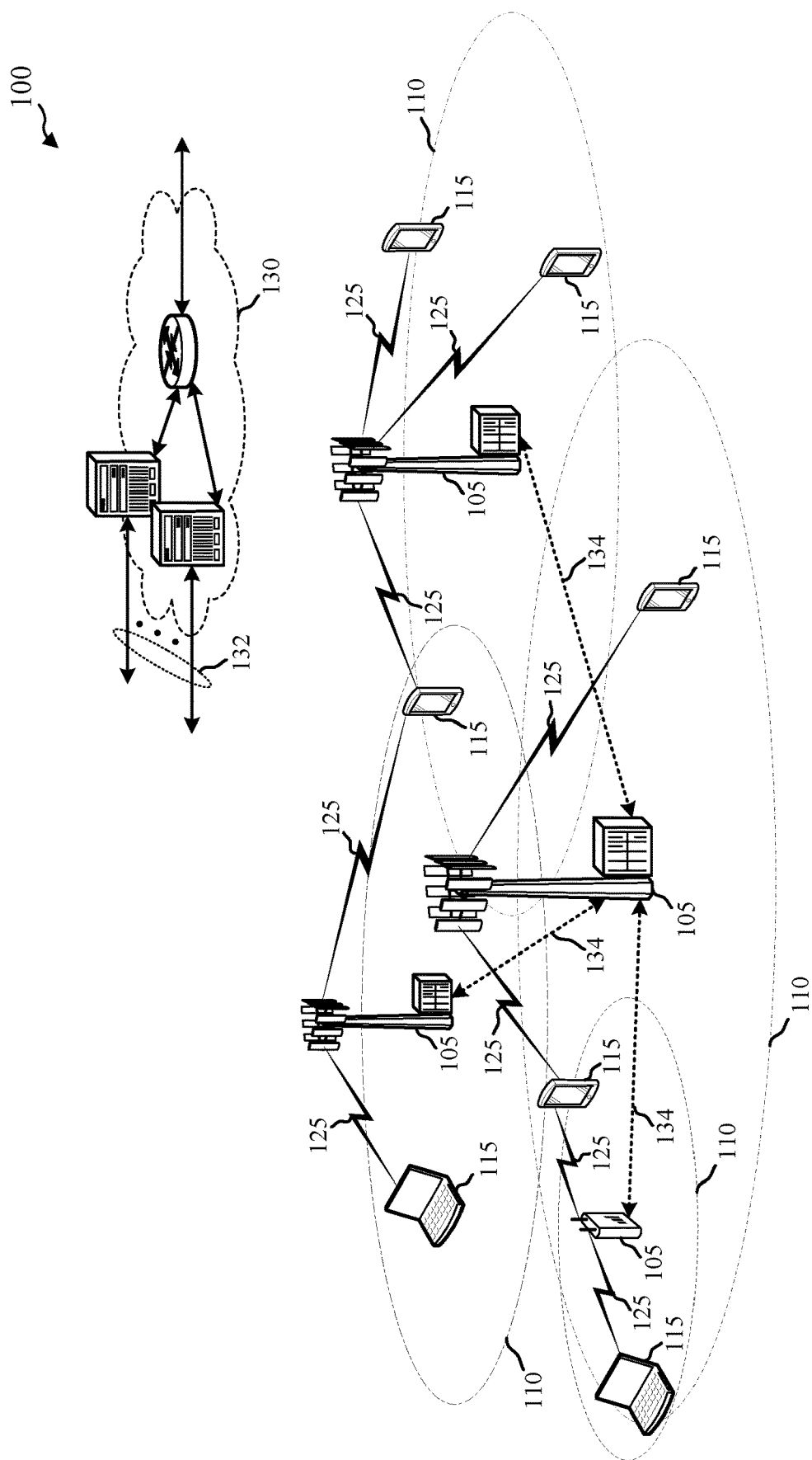
FIG. 1 illustrates an example of a system tier wireless communication that supports CQI design for eMTC in accordance with aspects of the present disclosure.

Resources for narrowband communication in a licensed or an unlicensed radio frequency spectrum band may be configured and allocated based on resource availability, regulatory constraints, device capability or category, etc. eMTC devices or other relatively low complexity devices, including those associated with the IoT, may communicate using one or more narrowbands, which may occupy six resource blocks (RBs) in some examples. In some cases, different countries may have different amounts of available bandwidth configurations that the devices may use.

By way of example, eMTC and IoT devices may transmit a relatively low amount of data periodically (or when requested) rather than continuously exchanging information with a base station (or other serving station). Such devices may include meters (e.g., water meter, gas meter), sensors (e.g., smoke detector, light sensor), or wearable technology (e.g, smart watches), which may have limited battery life or may be located at the edges of cell coverage areas. Instead of operating using a traditional deployment configuration designed for high data rates or continuous communication (e.g., LTE/LTE-Advanced (LTE-A)), these devices may communicate using deployment configurations designed to reduce the complexity of devices, increase coverage, and provide better battery life.

Depending on a geographic region of operation, the resource flexibility of an eMTC deployment may allow a device to satisfy, for example, certain bandwidth requirements (e.g., for a given application). While eMTC configurations may offer some advantages, channel measurement and reporting configurations may be limited in a traditional eMTC deployments. Accordingly, it may be possible to provide improved system performance to support narrowband techniques that facilitate flexible deployment operation (e.g. CCI design for eMTC deployments).

Aspects of the disclosure are initially described in the context of a wireless communication system. The wireless communication system may be a heterogeneous wireless communication system supporting traditional cellular communications (e.g., LTE/LTE-A) and also supporting narrowband communications (e.g., eMTC configured devices). In some aspects, a UE may monitor a first control channel (e.g., a machine physical downlink control channel (MPDCCH)) in a first frequency hand. The first frequency band may include one narrowband, e.g., six RBs where each RB has a corresponding number of time/frequency resources. The UE may determine that a bandwidth capability of the UE supports communicating on the first frequency band and at least a second frequency band, e.g., one or more other frequency hands. The UE may perform a channel measurement procedure on the first frequency band and the second frequency band concurrently. The UE may transmit a channel feedback message comprising information associated with the channel measurement procedure to a base station for example.

In some aspects, the UE may receive a scheduling indicator on a first control channel (e.g., MPDCCH) in a first frequency band. The UE may determine that a data transmission is scheduled for the UE based on the received scheduling indicator. The UE may identify a second frequency band associated with the data transmission, e.g., the number of narrowbands allocated for the data transmission to the UE. The UE may perform, based at least in part on the identified second frequency band, a channel measurement procedure on the second frequency band.

Aspects of the disclosure are further illustrated by and described with reference to apparatus diagrams, system diagrams, and flowcharts that relate to CQI design for eMTC.

FIG. 1 illustrates an example of a wireless communications system 100 in accordance with various aspects of the present disclosure. The wireless communication system 100 includes base stations 105, UEs 115, and a core network 130. In some examples, the wireless communication system 100 may be a LTE (or LTE-A) network, or a NR network. In some cases, wireless communication system 100 may support enhanced broadband communications, ultra-reliable mission critical) communications, low latency communications, and communications with low-cost and low-complexity devices. In some aspects, wireless communication system 100 may support communication between base stations 105 and UE 115 with different capabilities, e.g., LTE/LTE-A capabilities and eMTC capabilities).

Base stations 105 may wirelessly communicate with UEs 115 via one or more base station antennas. Each base station 105 may provide communication coverage for a respective geographic coverage area 110. Communication links 125 shown in wireless communication system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an IoT device, an Internet of Everything (IoE) device, a MTC device, an eMTC device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications, in other cases, D2D communications are carried out independent of a base station 105.

Some UEs 115, such as eMTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communication system may be configured to provide ultra-reliable communications for these functions.

Base stations 105 may communicate with the core network 130 and with one another. For example, base stations 105 may interface with the core network 130 through hackhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown), in some examples, base stations 105 may be macro cells, small cells, hot spots, or the like. Base stations 105 may also be referred to as eNodeBs (e-NBs) 105.

A base station 105 may be connected by an S1 interface to the core network 130. The core network may be an evolved packet core (EPC), which may include at least one mobility management entity (MME), at least one serving gateway (S-GW), and at least one packet gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate in an ultra high frequency (UHF) frequency region using frequency bands from 700 MHz to 2600 MHz (2.6 gigahertz (GHz)), although in some cases wireless communication system 100 may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beam arming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

In some cases, the antennas of a base station 105 or UE 115 may be located within one or more antenna arrays, which may support beamforming or multiple input/multiple output (MIMO) operations. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

Time intervals in LTE or NR may be expressed in multiples of a basic time unit. Time resources may be organized according to radio frames of length of 10 milliseconds (ms), for example, which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. in other cases, a TTI may be shorter than a subframe or may be dynamically selected (e.g., in short TTI bursts or in selected component carriers using short TTIs).

A resource element may consist of one symbol period and one subcarrier. A RB may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE 115 receives and the higher the modulation scheme, the higher the data rate may be.

In some cases, wireless communication system 100 may utilize both licensed and unlicensed radio frequency spectrum bands. For example, wireless communication system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LEFT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Wireless communication system 100 may support aspects of described techniques for CQI design for eMTC. For example, a UE 115 may monitor a first control channel in a first frequency hand. The UE 115 may determine that a bandwidth capability of the UE 115 supports communicating on the first frequency band and at least a second frequency band. The UE 115 may perform a channel measurement procedure on the first frequency band and the second frequency band concurrently. The UE 115 may transmit a channel feedback message comprising information associated with the channel measurement procedure.

Additionally or alternatively, the UE 115 may receive a scheduling indicator on a first control channel in a first frequency band. The UE 115 may determine that a data transmission is scheduled for the UE 115 based at least in part on the received scheduling indicator. The UE 115 may identify a second frequency band associated with the data transmission, and perform, based on the identified second frequency band, a channel measurement procedure on the second frequency band.

Figure 2:
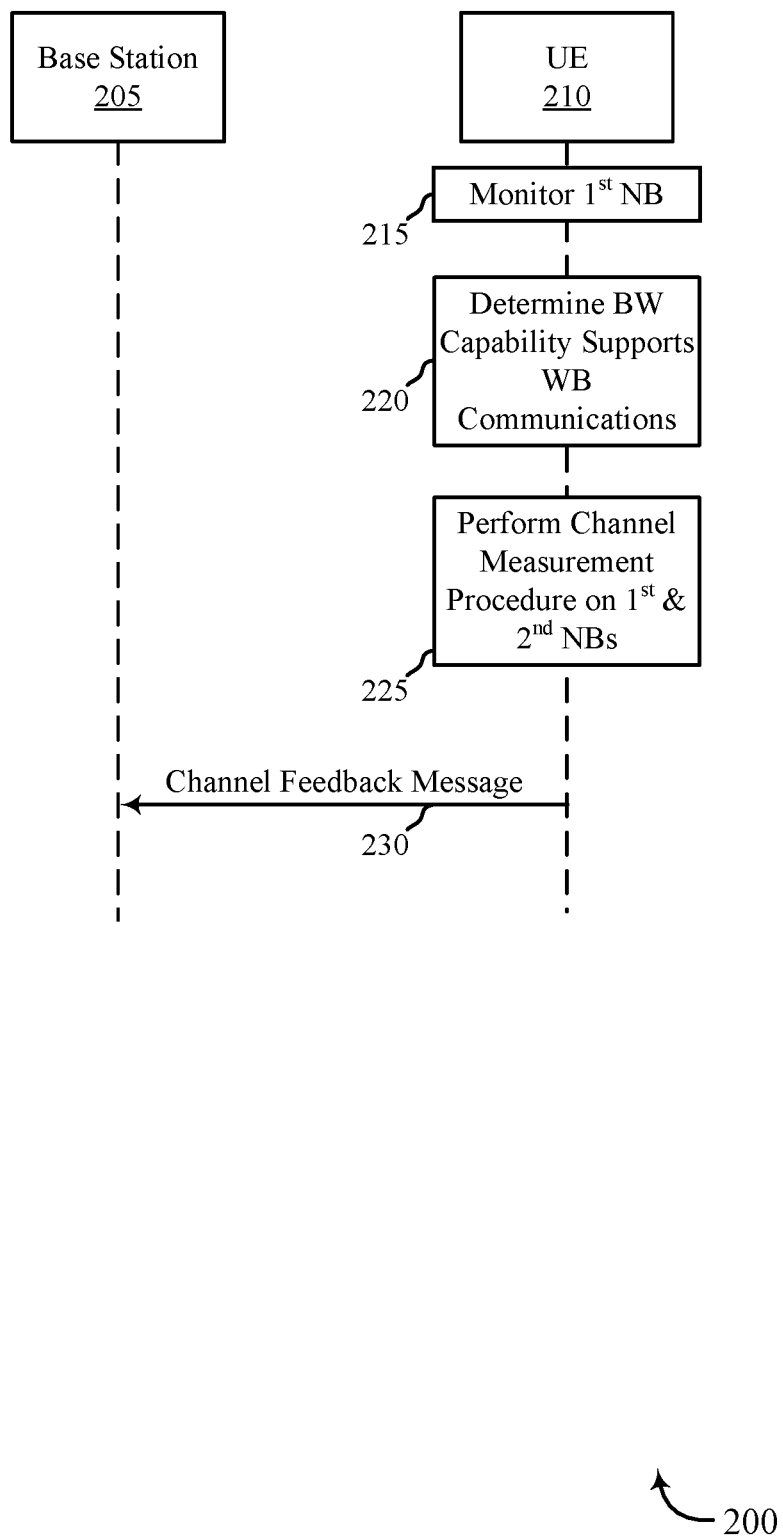
FIG. 2 illustrates an example of a process that supports CQI design for eMTC in accordance with aspects of the present disclosure.

FIG. 2 illustrates an example of a process 200 that supports CQI design for eMTC in accordance with various aspects of the present disclosure. Process 200 may implement aspect(s) of wireless communication system 100 of FIG. 1. Process 200 may include a base station 205 and a UE 210. Base station 205 and UE 210 may be examples of the corresponding devices described herein. The UE 210 may be an example of a wireless device.

Generally, process 200 illustrates an example of a UE 210 performing a channel measurement procedure on frequency bands in addition to the frequency band that the UE 210 is monitoring a control channel on. Broadly, the determination to perform the channel measurement procedure is based on the bandwidth capability of UE 210. Other considerations may include allocated frequency bands, power conservation, traffic load, etc.

In some aspects, an eMTC configured wireless communication system may include 2, 4, 8, 16, 32, 48, 64, or some other number of available narrowbands. Each narrowband (NB) may include a predetermined number of RBs (e.g., 6 RBs per narrowband) and have an associated bandwidth (e.g., 1.4. MHz). Each narrowband may be identified according to an index, e.g., NB0, NB1, NB3, and so forth. Moreover, certain narrowbands may be divided into predefined or preconfigured groups of narrowbands, e.g., a first group consisting of NB0-NB3, a second group consisting of NB4-NB7. Other group sizes may include 2 narrowbands per group, 6 narrowbands per group, etc.

Generally, eMTC configurations may include transmission of control information in a control channel. The control channel may be repeated in some, but not necessarily all, available narrowbands within a subframe. For instance, the control information may be transmitted in a control channel using a particular narrowband, e.g., NB0, during each subframe. In some examples, the control channel may hop across different narrowbands for each subframe, e.g., in NB0 in a first subframe, ire NB3 in a second subframe, etc.

Moreover, eMTC configurations may include transmission of data in a data channel (e.g., PDSCH). The data may be transmitted in a data transmission that may be indicated in the control channel. The data may be transmitted in the data channel using allocated narrowband(s), e.g., NB1, NB1, NB3, etc., during a subframe. In some examples, the data channel may hop across different narrowbands for each subframe, e.g., in NB0/NB1/NB3 in a first subframe, in NB2/NB3/NB5 in a second subframe, etc.

Moreover, each UE (such as UE 210) within an eMTC configured wireless communication system may have a different bandwidth capability. For example, every UE may be configured to communicate in at least one narrowband (e.g., have a bandwidth capability of 1.4 MHz), while certain UEs may be configured to communicate in multiple NBs (e.g., wideband UEs having bandwidth capabilities of 5 MHz, 20 MHz, etc.). Additionally, resource allocations for certain types of communications may be preconfigured in eMTC wireless communication systems. For example, transmission of the control information in the control channel may be limited to one narrowband, whereas data being transmitted in a data transmission may span multiple narrowbands for eMTC UEs that are configured for wideband communications. Examples of available widebands may include, but are not limited to, 1.4 MHz, 5 MHz, 20 MHz, and the like.

UEs (such as UE 210) within an eMTC configured wireless communication system may traditionally perform channel measurement and CQI reporting. For example, the UEs may be configured to perform channel measurement and reporting in a small portion of the narrowband that the UE is configured to monitor a control channel (e.g., MPDCCH) on (e.g., only on sub-carriers the UE is actually receiving the control information on). The control channel may be configured for a particular narrowband or may hop across different narrowbands in different subframes. Traditionally, the control channel is transmitted in one narrowband per subframe or, in some instances, one narrow band per group of narrowbands per subframe.

In a traditional eMTC configured wireless communication system, these configurations may result in decreased channel reporting when the UE cannot measure and report channel conditions in narrowbands other than the narrowband allocated for control channel transmission. Traditional eMTC configurations may not support the UE performing channel measurements in narrowbands other than the allocated control channel narrowband. Therefore, a UE that is configured for wideband communications (e.g., has a bandwidth capability that is wider than one narrowband) may miss an opportunity to measure and report channel conditions on sub-carrier(s) in narrowbands other than the control channel narrowband. Aspects of the described techniques, however, may provide a mechanism where the UE can determine to perform channel measurement and reporting in narrowbands other than the narrowband allocated for control channel transmission. This may provide improved channel monitoring that can be used by the base station to improve resource selection and allocation, for example.

In one aspect, UE 210 may perform channel measurements in RBs of the narrowband other than those used for the control information. For example, the control information typically occupies a limited amount of information and may therefore be transmitted in only one or two RBs, only a portion of one RB, etc. For a narrowband allocated to the control channel, this means that the sub-carriers in the unused RBs (or unused sub-carriers in the control channel RB(s)) may be used for performing channel measurements and reporting by the UE.

In another aspect, UE 210 may perform channel measurements in RBs of the control channel narrowband as well as in RBs allocated for a data transmission in a data channel (e.g., physical downlink shared channel (PDSCH)). For example, UE 210 may have an allocated narrowband for control information and other narrowbands allocated for UE 210 to receive data in a data transmission in a subframe. UE 210 may perform channel measurement and reporting in the control channel narrowband and the data channel narrowband(s). In some aspects, UE 210 may use a bandwidth larger than the data transmission. For example, the bandwidth UE 210 uses for data channel decoding may be larger than the allocated data channel. UE 210 may open up a wider bandwidth (e.g., 5 MHz) even if the data transmission is only allocated to ten RBs (e.g., two narrowbands).

In another aspect, UE 210 may autonomously e.g., without instructions to do so and/or based on preconfigured settings, determine to perform channel measurement and reporting based on the bandwidth capability of UE 210. For example, UE 210 may determine that its bandwidth capability supports communicating in narrowbands in addition to the allocated control channel narrowband. Thus, UE 210 may determine that it will open up bandwidths and perform channel measurement and reporting in the control channel narrowband and additional narrowband(s).

Thus, process 200 and the herein described techniques provide for UE 210 to perform additional channel measurement and reporting (e.g., CQI reporting) in narrowband(s) to improve the information available to base station 205, for example, to use for resource assignment and allocation. Aspects of the described techniques may be implemented based on a power usage consideration (e.g., UE 210 may perform additional channel measurement and reporting in a manner to conserve power) and/or based on an amount of traffic (e.g., UE 210 may perform additional channel measurement and reporting when traffic is high to improve CQI accuracy, but refrain when traffic is low to conserve power).

At 215, UE 210 may monitor a first control channel in a first frequency band (e.g., a first narrowband). The first frequency band may be based on a narrowband allocated for transmission of control information on a control channel to UE 210. The first frequency band may refer to the bandwidth of the narrowband (or simply the narrowband), the bandwidth of the RB(s) used to convey the control information in the narrowband, the bandwidth of the sub-carriers used to convey the control information, etc. The first frequency band may be configured to be the same during subframe(s) or may hop across different subframe(s).

At 220, UE 210 may determine that a bandwidth capability of UE 210 supports communicating in the first frequency band and at least a second frequency band. The bandwidth capability may be wider than the bandwidth of the first frequency band. The bandwidth capability of UE 210 may be 1.4 MHz, 5 MHz, 20 MHz, or some other bandwidth that supports communicating in the first and second frequency bands.

In some aspects, the second frequency band may refer to narrowbands other than the narrowband allocated for the control channel. The second frequency band may include narrowband(s) within a preconfigured set or group of narrowbands.

At 225, UE 210 may perform a channel measurement procedure on the first frequency band and the second frequency band, e.g., concurrently. The channel measurement procedure may include measuring reference signal received power (RSRP), received signal strength indicator (RSSI), pathloss, throughput measurement, signal-to-noise ratio (SNR), CQI, etc. The channel measurement procedure may be performed autonomously by UE 210, based on receiving a channel measurement request message from base station 205, based on preconfigured settings, and the like. The channel measurement procedure may be performed based on an available power of UE 210, based on traffic load on the measured channel, and the like.

In some aspects, UE 210 may select the second frequency band using a multi-step process. The second frequency band may also be referred to as a subband. In some configurations, the size of the subband may be too large if restricted to widebands (e.g., using a 5 MHz bandwidth may need more resolution). Thus, in some aspects UE 210 may use a first stage where UE 210 determines the widebands in which UE 210 monitors the control channel (e.g., MPDCCH). In a second stage, UE 210 may determine the subbands that are within this set of widebands. Each subband may be a traditional narrowband or may be a different bandwidth value (e.g., two or more narrowbands). UE 210 may apply the described CQI reporting techniques to and based on these subbands. For example, if the subband size is two narrowbands and there are two widebands for monitoring, the second frequency band may be four subbands (e.g., each wideband may have four narrowbands, which equals two subbands). UE 210 may report the best subband using two bits, for example.

In some aspects, the subband size may depend on the number of widebands used for control channel monitoring. In one example where four subbands are available for selection, UE 210 may have several alternatives. In one alternative, one wideband for control channel monitoring may include each subband being one narrowband, which may provide for one wideband including four narrowbands. In another alternative, two widebands for control channel monitoring may include each subband having two narrowbands. In another alternative, four widebands for control channel monitoring may include four subbands. When the control channel hops between three widebands (e.g., two of the narrowbands are in the same wideband), UE 210 may use the design for four widebands and the fourth value of the two bits in the feedback report may be reserved.

In some aspects, the second frequency band may use predefined widebands. As one example for a UE having a 20 MHz bandwidth capability, the second frequency band may include the entire 20 MHz bandwidth. As another example for a UE having a 5 MHz bandwidth capability, the UE in 20 MHz bandwidth may define four widebands (e.g., each wideband comprising a 5 MHz bandwidth). The UE monitoring a particular narrowband may measure the CQI on all narrowbands in the predefined wideband containing the narrowband. When the control channel hops within one wideband, the UE may report the CQI for four narrowbands. When the control channel hops within two widebands, the UE may report CQI in eight narrowbands. When the control channel hops within four widebands, the UE may report CQI for 16 narrowbands.

In some aspects, UE 210 may select different set of narrowbands around the control channel narrowband. The selection may depend on what channel measurement needs are warranted. For example, if the control channel is allocated NB3, a 5 MHz capable UE may measure NB0-NB3 on a few subframes and NB3-NB7 on other subframes. This may provide for CQI reports for NB0-NB7 while still monitoring the control channel on NB3. This may also be used for data transmissions when the wider bandwidth is used for the data transmission decoding. When the control channel is configured appropriately by the network, the UE may measure the full 20 MHz bandwidth with just two control channel narrowbands being configured. The eMTC wireless communication system may be configured such that the CQI report may cover a bandwidth that is larger than the UE's reported radio frequency (RF) bandwidth even when no control channel hopping is configured. In this instance, the UE may measure half the bandwidth in one subframe, the other half of the bandwidth in the next subframe, and construct the CQI report for the full bandwidth. In some aspect, the number of configured control channel narrowbands may be increased so the UE has more narrowband measurements over time.

At 230, UE 210 may transmit a channel feedback message to base station 205 that comprises information associated with the channel measurement procedure. Broadly, the channel feedback message may include information indicative of the channel measurement results, e.g., raw information, information determined based on the channel measurement procedure, and the like.

The channel feedback message may include CQI reporting. Such CQI reporting may include periodic CQI reporting and/or aperiodic CQI reporting. The CQI reporting may include a full bandwidth CQI, a best bandwidth indicator, a bandwidth differential, a CQI (e.g., per channel), a subband report, a PMI, and the like.

In some aspects, CQI reporting may have a periodicity mode of 2, 5, 10, 20, 40, etc., subframes. There may be three modes of CQI reporting, e.g., Mode 1-0 and Mode 1-1 associated with periodic CQI reporting and Mode 2-0 associated with aperiodic reporting. Mode 1-0 may include CQI reporting without PMI. Mode 1-1 may include CQI reporting with PMI, full bandwidth CQI and PMI. For example, every $n^{th}$ CQI may contain the PMI. Mode 2-0 may include CQI reporting of the narrowband CQI (e.g., two or four narrowbands based on the configuration) and full bandwidth CQI reporting. Mode 2-0 may not include a PMI, but may use TxD based CQI. The CQI report may include wideband (e.g., full bandwidth) CQI, best narrowband index, corresponding differential CQI (e.g., best narrowband CQI minus wideband CQI). The narrowbands that UE 210 may measure during the channel measurement procedure may depend on the control channel configuration and the hopping configuration, when applicable.

The transmission triodes supported in eMTC configured wireless communication systems may include, but are not limited to, TM1:1Tx, TM2:TxD, TM6:rank 1 spatial multiplexing with closed loop PMI, TM9, UE reference signal (UERS).

In some aspects, the CQI reporting may be performed according to at least a couple options. In a first aperiodic option, the CQI reporting may include reporting the full bandwidth CQI, the best narrowband, and a narrowband differential CQI. In some aspects, the CQI reporting may include continued reporting in units of narrowband. This may increase the number of narrowbands, the number of CQI feedback bits, etc. In some aspects, the CQI reporting may include increasing the bandwidth of the narrowband report, e.g., introduce a new subband report. The CQI reporting may include wideband (e.g., the full bandwidth CQI), the best subband, and the differential subband CQI. The subbands may be a function of the system bandwidth in addition to the UE bandwidth capability. For example, a 10 MHz system bandwidth may define four subbands where each subband contains two narrowbands. A 20 MHz system bandwidth may define four subbands, where each subband contains four narrowbands. In some aspects, the subbands may be signaled to the UE. A PMI feedback may be added instead of (or in addition to) a TxD based CQI. For example, the PMI may be wideband only PMI, best narrowband PMI, or both. The CQI reporting (e.g., TxD or PMI based) may be send as a function of the transmission mode.

In a second periodic option, the CQI reporting may include wideband CQI and may rotate through the bandwidth part containing multiple subbands. Best subband CQIs for the bandwidth part may be reported.

Certain aspects of the described techniques may provide for CQI table enhancements. Traditionally for a large range for low signal-to-noise ratios (SNRs), the UE reports CQI 0. Entries in the CQI table may be added for lower SNRs, include UE recommendations of repetition factor to use, etcc, so that lower SNR CQI reports are more meaningful. This may be helpful to NB-IoT as well if CQI feedback support is added In some aspects, UE 210 may measure larger bandwidths in response to an aperiodic CQI request. Aperiodic CQI may be triggered in an uplink grant sent using a different timeline (more gap between the uplink grant and an uplink data channel (e.g., physical uplink shared channel (PUSCH)/CQI report) as current timeline may not leave enough time for the UE to measure the channel(s). The extra delay may apply to CQI and not to PUSCH, in some examples. Aperiodic CQI reporting sent along with an acknowledgement/negative-acknowledgement (ACK/NACK) may be triggered by the control channel for a downlink grant.

Figure 3:
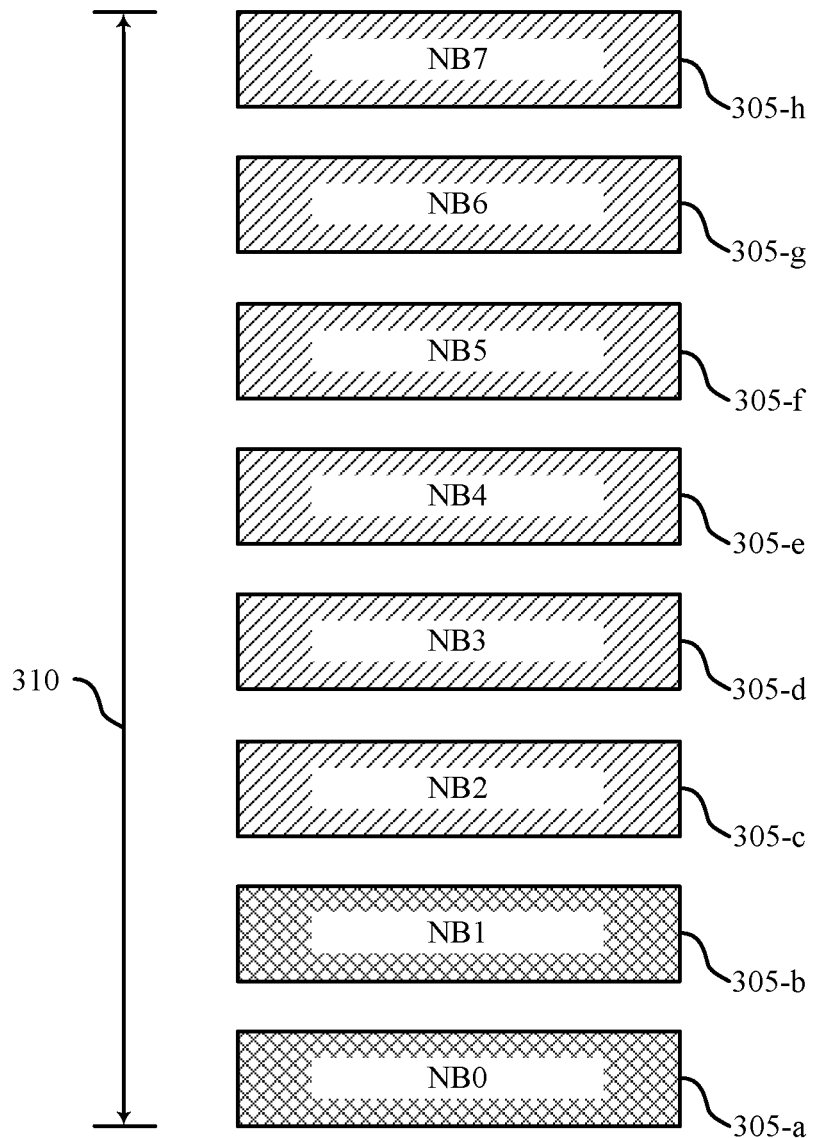
FIG. 3 illustrates an example of a channel configuration that supports CQI design for eMTC in accordance with aspects of the present disclosure.

FIG. 3 illustrates an example of a channel configuration 300 that supports CQI design for eMTC in accordance with various aspects of the present disclosure. Channel configuration 300 may implement aspect(s) of wireless communication system 100 and/or process 200 of FIGS. 1 and 2. Channel configuration 300 may be implemented by a UE 115 and/or a base station 105 for wireless communications in a eMTC system. The UE 115 and base station 105 may be examples of the corresponding devices described herein.

Generally, channel configuration 300 may include a plurality of NBs 305, with eight NBs 305 being shown by way of example. Each NB may have an associated index number. Thus, channel configuration 300 may include NB0 305-a, NB1 305-b, NB2 305-b, and so forth. Each NB 305 may have an associated bandwidth and may include, in some examples, 6 RBs. As discussed above, each RB may have 12 sub-carriers in the frequency domain that span multiple symbol periods in the time domain.

Moreover, channel configuration 300 also indicates a relationship between the NBs 305 and a bandwidth capability 310 of a UE. The bandwidth capability 310 may be determined based on the configuration of the UE, on the number of communication chains of the UE, and the like.

As is discussed, a control channel may have an associated first frequency band. The size of the first frequency hand may be determined based on the number of NBs 305 allocated to the control channel for transmission of control information. Control information being transmitted in a NB 305 may occupy a plurality of RBs of the NB 305, but may not occupy every resource or RB of the NB 305. Thus, a particular NB 305 may carry control information for control channel transmission within the subframe.

Control information may not be allocated for every NB 305 during a subframe. Instead, the control channel may be allocated to one NB 305 per subframe, may be hopped across different NBs 305 for different subframes, and the like. The control channel within a NB 305 may be inferred through the resource allocation and/or based on a downlink control indicator (DCI) for the data channel. The control channel transmission therefore may have an associated second bandwidth that corresponds to a particular NB 305 (e.g., the full bandwidth of the NB 305, a bandwidth of the sub-carrier(s) within a RB carrying the control channel, etc.)

As also discussed, the UE may identify a second frequency band to perform a channel measurement procedure on based on the bandwidth capability 310 of the UE. The bandwidth capability 310 used to identify the second frequency band may support the UE performing the channel measurement procedure on the first and second frequency bands concurrently in a subframe, e.g., at the same time using different communication chains.

The second frequency band may be based on predefined frequency band configurations that include a set of NBs 305. Examples of the predefined frequency band configuration may include one set comprising NBs 305-*a* through 305-*d* and a second set comprising NBs 305-*e* through 305-*h*. Other examples may include two, six, eight, or some other number of NBs 305 per set. The second frequency band may be overlapping (e.g., NBs 305-*a* and 305-*c* may overlap with NB 305-*b*) or non-overlapping (e.g., NBs 305-*a* and 305-*b* may not overlap with NB 305-*c*).

Figure 4:
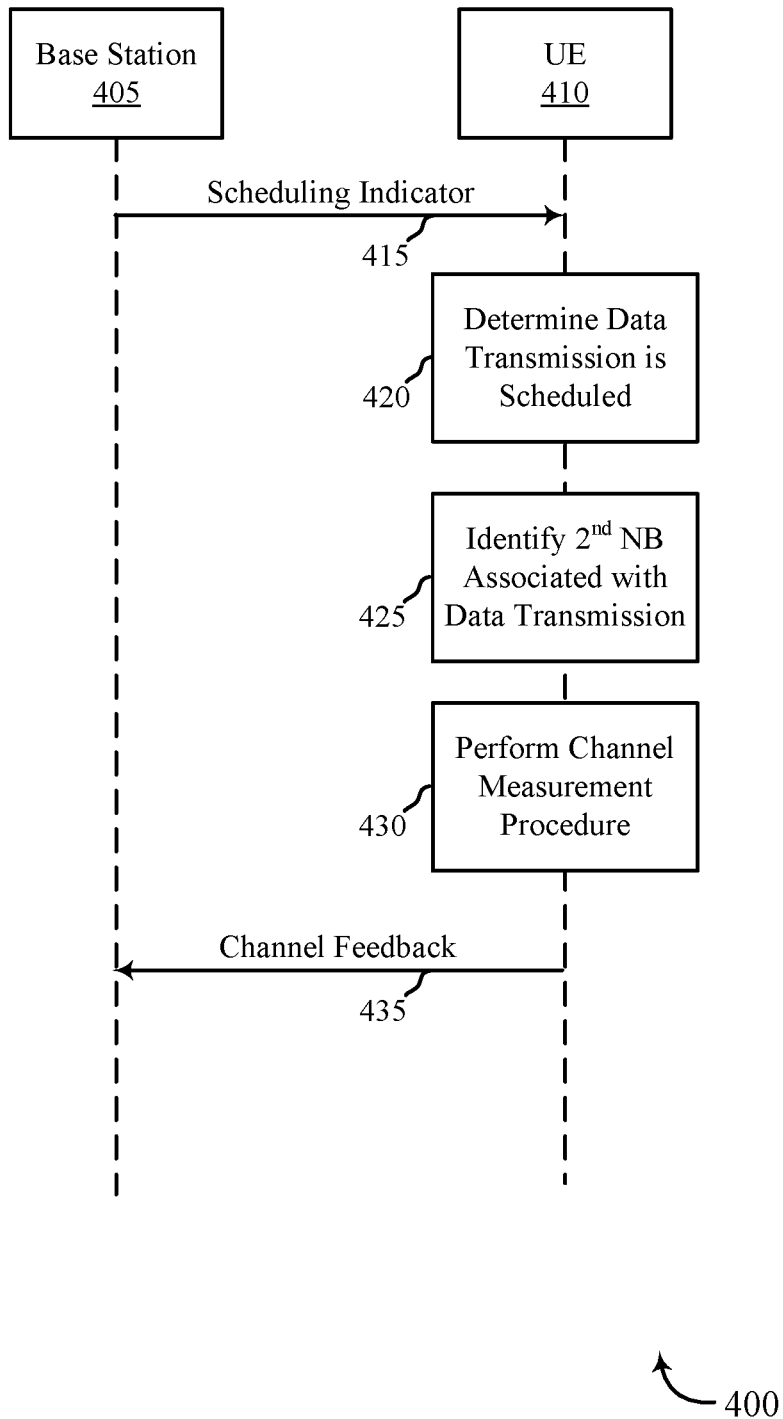
FIG. 4 illustrates an example of a channel configuration that supports CQI design for eMTC in accordance with aspects of the present disclosure.

FIG. 4 illustrates an example of a process 400 that supports CQI design for eMTC in accordance with various aspects of the present disclosure. Process 400 may implement aspect(s) of wireless communication system 100, process 200, and/or carrier configuration 300 of FIGS. 1 through 3. Process 400 may include a base station 405 and a UE 410. Base station 405 and UE 410 may be examples of the corresponding devices described herein. The UE 410 may be an example of a wireless device.

Generally, process 400 illustrates an example of UE 410 performing channel measurement procedures in narrowbands associated with a data transmission in a data channel to UE 410. For example, the data transmission allocated to UE 410 may be scheduled for transmission in a plurality of narrowbands and UE 410 may select these (and other) narrowbands to perform the channel measurement procedure on.

At 415, UE 410 may receive a scheduling indicator on a first control channel in a first frequency band. The scheduling indicator may be received from base station 405 and may include control information associated with the data transmission, e.g., a starting point, length, etc., for the data transmission.

At 420, UE 410 may determine that a data transmission is scheduled for UE 410. The determination may be based on the scheduling indicator. For example, UE 410 may receive and decode the scheduling indicator to determine that the data transmission is scheduled for UE 410, where the data transmission will be received in (e.g., which narrowband(s), which RBs within the narrowband(s) will carry the data, etc.).

At 425, UE 410 may identify a second frequency band associated with the data transmission. The second frequency band may include a number of narrowband(s) allocated to transmit the data in the data transmission. The second frequency band may be part of a preconfigured set of frequency bands, a set of frequency bands that are adjacent to the first frequency band, a set of wideband frequency bands, and the like.

At 430, UE 410 may perform a channel measurement procedure on the second frequency band. UE 410 may perform the channel measurement procedure autonomously (e.g., without input from a network, base station 405, etc.) or based on a request message (e.g., received from base station 405).

At 435, UE 410 may optionally transmit a channel feedback message to base station 405. The channel feedback message may be based on the channel measurement procedure and may include a full bandwidth CQI, a best bandwidth indicator, a bandwidth differential, a CQI, a subband report, a PMI, and the like (or combinations thereof).

Figure 5:
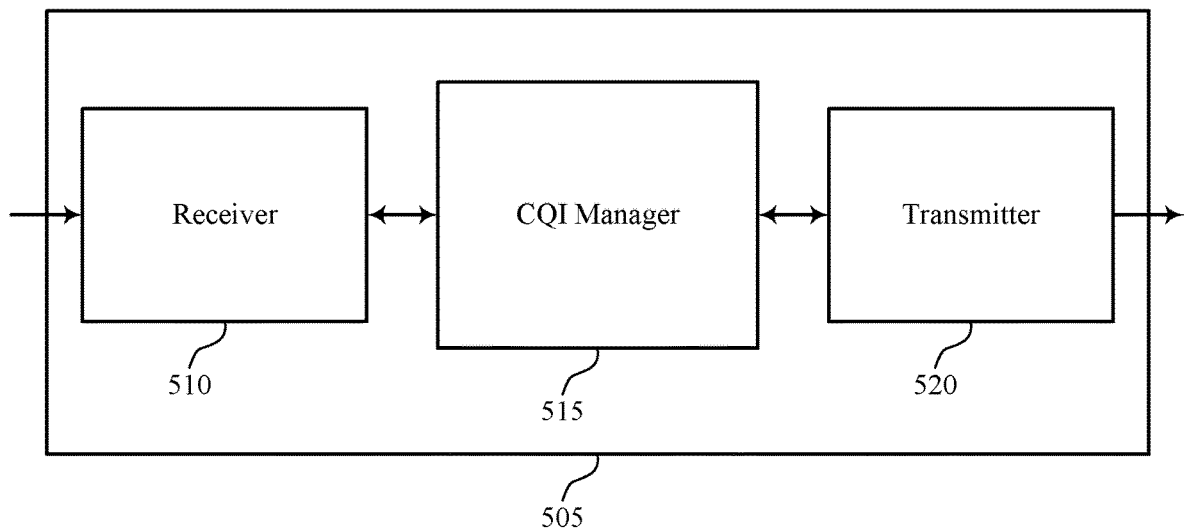
FIGS. 5 through 7 show block diagrams of a device that supports CQI design for eMTC in accordance with aspects of the present disclosure.

FIG. 5 shows a block diagram 500 of a wireless device 505 that supports CQI design for eMTC in accordance with various aspects of the present disclosure. Wireless device 505 may be an example of aspects of a UE 115 as described with reference to FIG. 1, wireless device 505 may include a receiver 510, a CQI manager 515, and a transmitter 520, wireless device 505 may also include a processor. Each of these components may be in communication with one another (e.g., via one or more buses).

Receiver 510 may receive information such as packets, user data, or control information associated with various information channels (e.g., control channels, data channels, and information related to CQI design for eMTC, etc.). Information may be passed on to other components of the device. The receiver 510 may be an example of aspects of the transceiver 835 described with reference to FIG. 8.

CQI manager 515 may be an example of aspects of the CQI manager 815 described with reference to FIG. 8.

CQI manager 515 and/or at least some of its various sub-components may be implemented in hardware, software executed by a processor, firmware, or any combination thereof. If implemented in software executed by a processor, the functions of the CQI manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The CQI manager 515 and/or at least some of its various sub-components may be physically located at various positions, including being distributed such that portions of functions are implemented at different physical locations by one or more physical devices. In some examples, CQI manager 515 and/or at least some of its various sub-components may be a separate and distinct component in accordance with various aspects of the present disclosure. In other examples, CQI manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some aspects, CQI manager 515 may monitor, by a wireless device, a first control channel in a first frequency band. CQI manager 515 may determine that a bandwidth capability of the wireless device supports communicating on the first frequency band and at least a second frequency band. CQI manager 515 may perform a channel measurement procedure on the first frequency band and the second frequency band concurrently. CQI manager 515 may transmit a channel feedback message including information associated with the channel measurement procedure.

In some aspects, CQI manager 515 may also receive, at a wireless device, a scheduling indicator on a first control channel in a first frequency band. CQI manager 515 may determine that a data transmission is scheduled for the wireless device based on the received scheduling indicator. CQI manager 515 may identify a second frequency band associated with the data transmission. CQI manager 515 may perform, based on the identified second frequency band, a channel measurement procedure on the second frequency band.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas.

Figure 6:
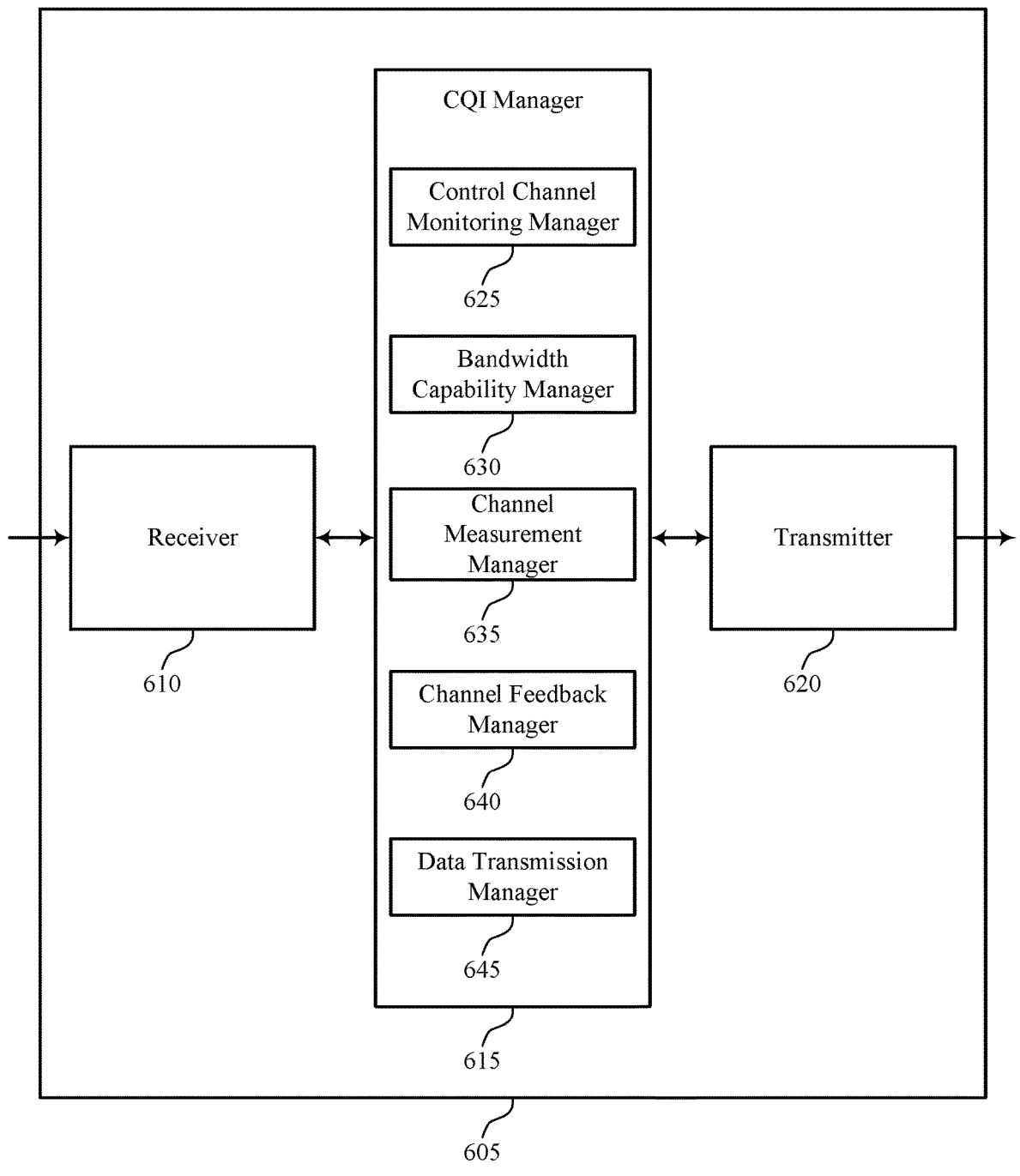

FIG. 6 shows a block diagram 600 of a wireless device 605 that supports CQI design for eMTC in accordance with various aspects of the present disclosure. Wireless device 605 may be an example of aspects of a wireless device 505 or a UE 115 as described with reference to FIGS. 1 through 5. wireless device 605 may include a receiver 610, a CQI manager 615, and a transmitter 620, wireless device 605 may also include a processor. Each of these components may be in communication with one another (e.g., via one or more buses).

Receiver 610 may receive information such as packets, user data, or control information associated with various information channels (e.g., control channels, data channels, and information related to CQI design for eMTC, etc.). Information may be passed on to other components of the device. The receiver 610 may be an example of aspects of the transceiver 835 described with reference to FIG. 8.

CQI manager 615 may be an example of aspects of the CQI manager 815 described with reference to FIG. 8. CQI manager 615 may also include a control channel monitoring manager 625, a bandwidth capability manager 630, a channel measurement manager 635, a channel feedback manager 640, and a data transmission manager 645.

Control channel monitoring manager 625 may monitor, by a wireless device, a first control channel in a first frequency band. Control channel monitoring manager 625 may receive, at a wireless device, a scheduling indicator on a first control channel in a first frequency band.

Bandwidth capability manager 630 may determine that a bandwidth capability of the wireless device supports communicating on the first frequency band and at least a second frequency band. Bandwidth capability manager 630 may identify a second frequency band associated with the data transmission. In some cases, the second frequency band is larger than the first frequency band and includes the first frequency band.

Channel measurement manager 635 may perform a channel measurement procedure on the first frequency band and the second frequency band concurrently. Channel measurement manager 635 may receive a configuration message conveying a channel measurement request. Channel measurement manager 635 may perform the channel measurement procedure on the first frequency band and the second frequency band based on the configuration message. Channel measurement manager 635 may perform the channel measurement procedure on the first frequency band and the second frequency band during the identified portion of subframes. Channel measurement manager 635 may autonomously determine, by the wireless device, to perform the channel measurement procedure on the first frequency band and the second frequency band. Channel measurement manager 635 may perform, based on the identified second frequency band, a channel measurement procedure on the second frequency band. Channel measurement manager 635 may autonomously determine, by the wireless device, to perform the channel measurement procedure on the second frequency band. Channel measurement manager 635 may perform the channel measurement procedure on the second frequency band based on the configuration message. In some cases, the channel measurement procedure is performed according to a periodic schedule or an aperiodic schedule.

Channel feedback manager 640 may transmit a channel feedback message including information associated with the channel measurement procedure. Channel feedback manager 640 may increase a number of bits in channel feedback message to carry the contents of the channel feedback message. In some cases, the channel feedback message includes one or more of a full bandwidth CQI, a best bandwidth indicator, a bandwidth differential, CQI, a subband report, a PMI, or combinations thereof.

Data transmission manager 645 may determine that a data transmission is scheduled for the wireless device based on the received scheduling indicator.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
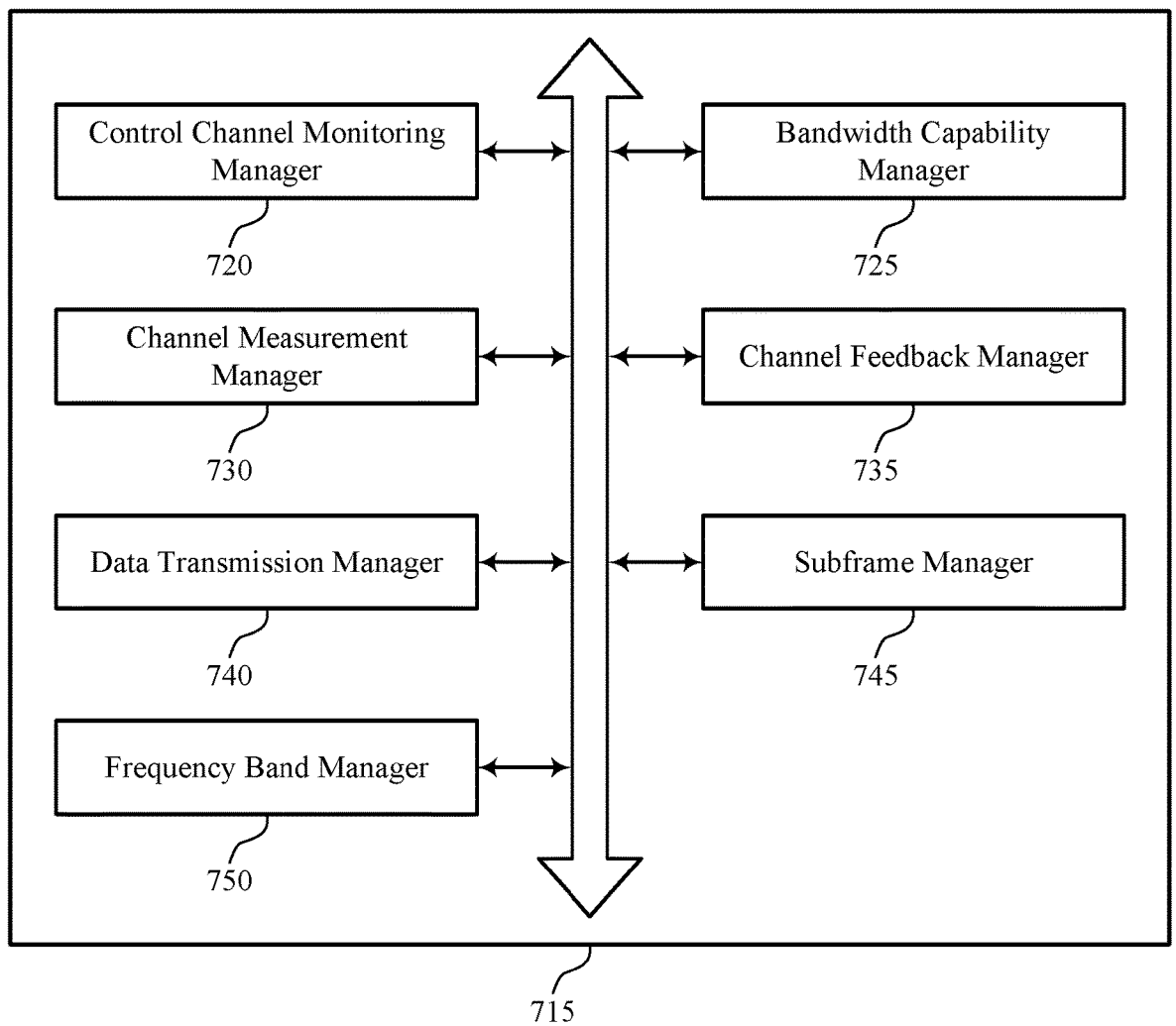

FIG. 7 shows a block diagram 700 of a CQI manager 715 that supports CQI design for eMTC in accordance with various aspects of the present disclosure. The CQI manager 715 may be an example of aspects of a CQI manager 515, a CQI manager 615, or a CQI manager 815 described with reference to FIGS. 5, 6, and 8. The CQI manager 715 may include a control channel monitoring manager 720, a bandwidth capability manager 725, a channel measurement manager 730, a channel feedback manager 735, a data transmission manager 740, a subframe manager 745, and a frequency band manager 750. Each of these modules may communicate, directly or indirectly, with one another (e.g., via one or more buses).

Control channel monitoring manager 720 may monitor, by a wireless device, a first control channel in a first frequency band. Control channel monitoring manager 720 may receive, at a wireless device, a scheduling indicator on a first control channel in a first frequency band.

Bandwidth capability manager 725 may determine that a bandwidth capability of the wireless device supports communicating on the first frequency band and at least a second frequency band. Bandwidth capability manager 725 may identify a second frequency band associated with the data transmission. In some cases, the second frequency band is larger than the first frequency band and includes the first frequency band.

Channel measurement manager 730 may perform a channel measurement procedure on the first frequency band and the second frequency band concurrently. Channel measurement manager 730 may receive a configuration message conveying a channel measurement request. Channel measurement manager 730 may perform the channel measurement procedure on the first frequency band and the second frequency band based on the configuration message. Channel measurement manager 730 may perform the channel measurement procedure on the first frequency band and the second frequency band during the identified portion of subframes. Channel measurement manager 730 may autonomously determine, by the wireless device, to perform the channel measurement procedure on the first frequency band and the second frequency band. Channel measurement manager 730 may perform, based on the identified second frequency band, a channel measurement procedure on the second frequency band. Channel measurement manager 730 may perform the channel measurement procedure on the second frequency band based on the configuration message. In some cases, the channel measurement procedure is performed according to a periodic schedule or an aperiodic schedule. In some cases, the channel measurement procedure is performed according to a periodic schedule or an aperiodic schedule.

Channel feedback manager 735 may transmit a channel feedback message including information associated with the channel measurement procedure. Channel feedback manager 735 may increase a number of bits in channel feedback message to carry the contents of the channel feedback message. In some cases, the channel feedback message includes one or more of a full bandwidth CQI, a best bandwidth indicator, a bandwidth differential, CQI, a subband report, a PMI, or combinations thereof.

Data transmission manager 740 may determine that a data transmission is scheduled for the wireless device based on the received scheduling indicator.

Subframe manager 745 may identify a portion of subframes from a set of subframes to perform the channel measurement procedure. Subframe manager 745 may perform the channel measurement procedure on the second frequency band during the identified portion of subframes.

Frequency band manager 750 may identify a preconfigured set of frequency bands, where the first and second frequency bands are included in the preconfigured set of frequency bands. Frequency band manager 750 may determine a set of wideband frequency bands associated with the wireless device monitoring a control channel. Frequency band manager 750 may select the first and second frequency bands that are within the wideband frequency bands. Frequency band manager 750 may identify a set of frequency bands that are adjacent to the first frequency band, where the second frequency band is included in the set of frequency bands. In some cases, the second frequency band includes one of a 5 MHz bandwidth or a 20 MHz bandwidth. In some cases, the first frequency band includes a 1.4 MHz bandwidth.

Figure 8:
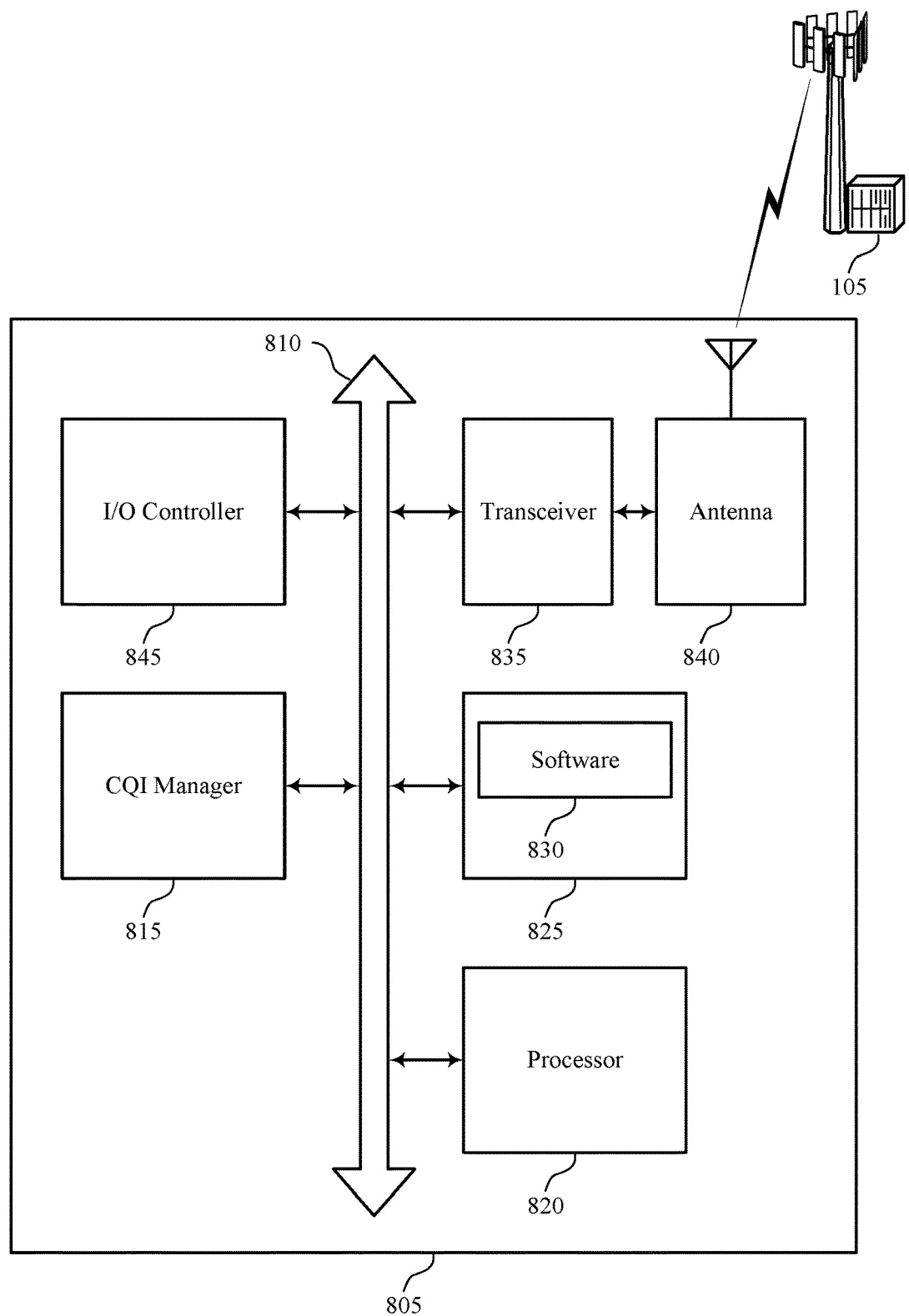
FIG. 8 illustrates a block diagram of a system including a UE that supports CQI design for eMTC in accordance with aspects of the present disclosure.

FIG. 8 shows a diagram of a system 800 including a device 805 that supports CQI design for eMTC in accordance with various aspects of the present disclosure. Device 805 may be an example of or include the components of wireless device 505, wireless device 605, or a UE 115 as described above, e.g., with reference to FIGS. 1 through 6. Device 805 may include components for bi-directional voice and data communications including components for transmitting and receiving communications, including a CQI manager 815, a processor 820, a memory 825, a software 830, a transceiver 835, an antenna 840, and an I/O controller 845. These components may be in electronic communication via one or more busses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting CQI design for eMTC).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support CQI design for eMTC. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate hi-directionally with another wireless transceiver.

The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as IOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
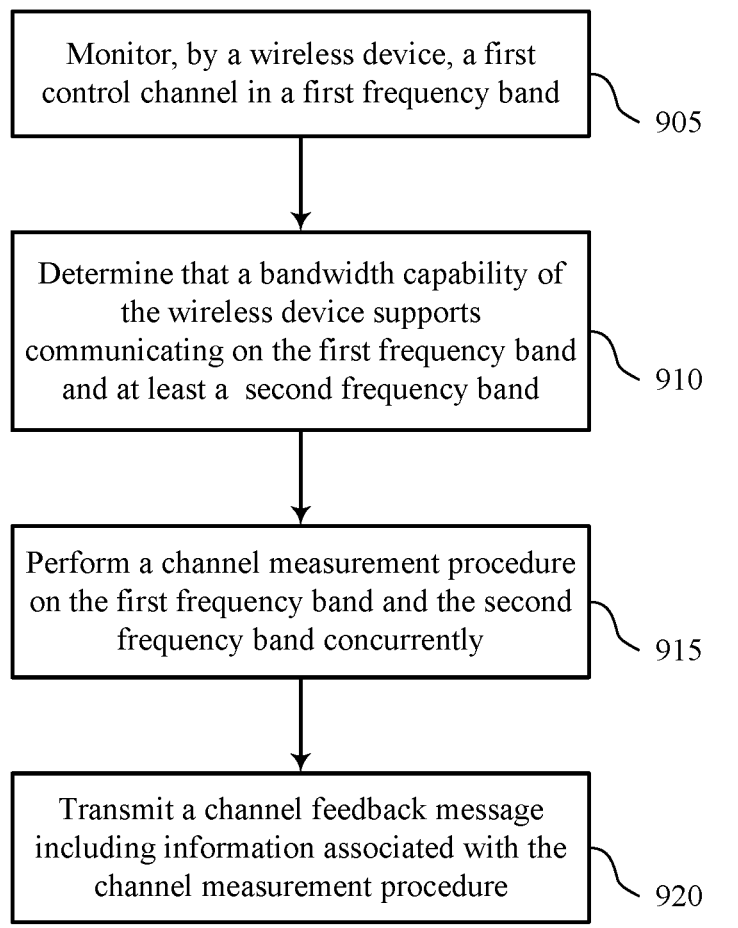
FIGS. 9 through 13 illustrate methods for CQI design for eMTC in accordance with aspects of the present disclosure.
Figure 10:
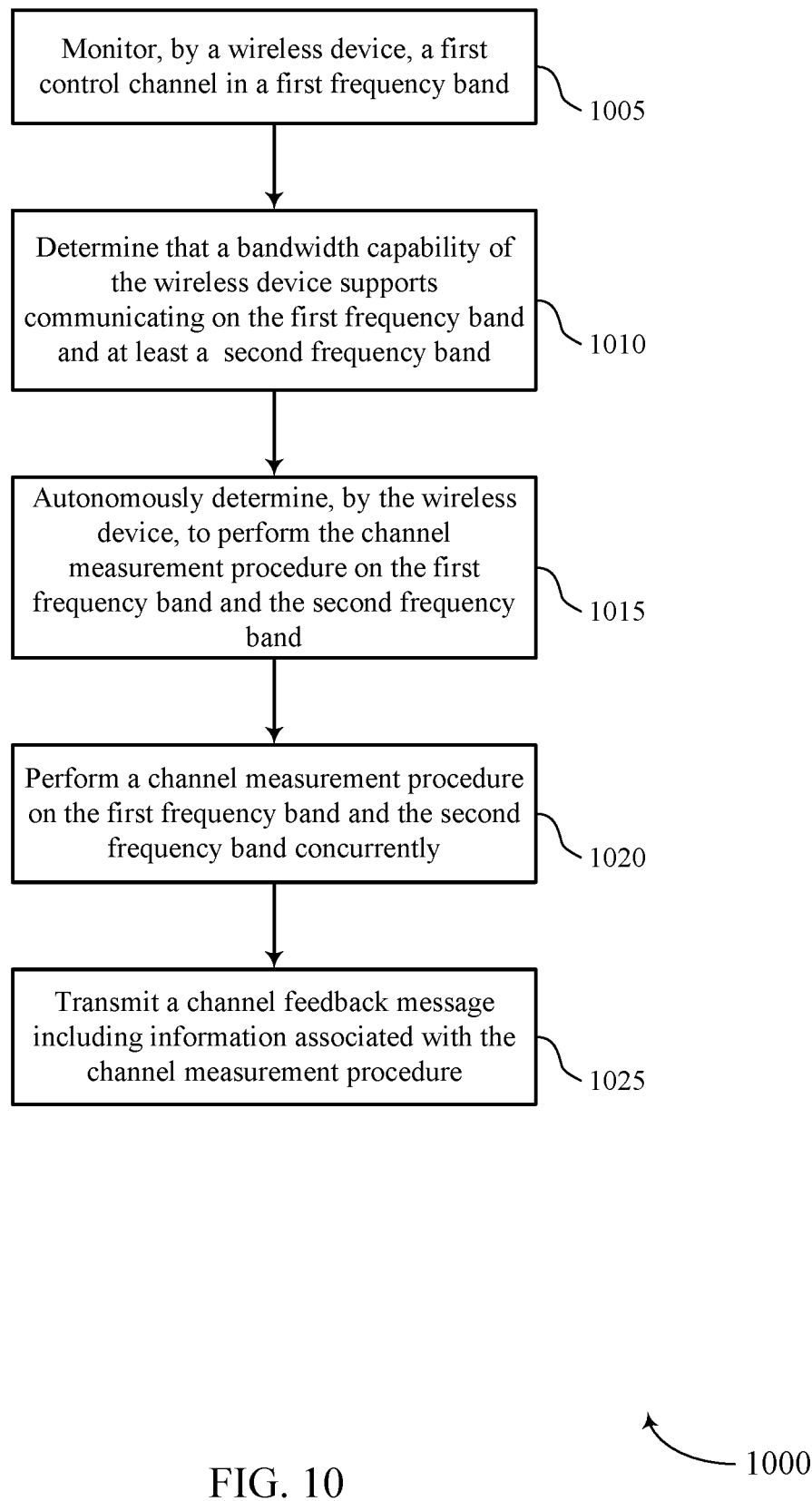

FIG. 9 shows a flowchart illustrating a method 900 for CQI design for eMTC in accordance with various aspects of the present disclosure. The operations of method 900 may be implemented by a UE 115 or its components as described herein. For example, the operations of method 900 may be performed by a CQI manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 905 the UE 115 may monitor, by a wireless device, a first control channel in a first frequency band. The operations of block 905 may be performed according to the methods described with reference to FIGS. 1 through 4. In certain examples, aspects of the operations of block 905 may be performed by a control channel monitoring manager as described with reference to FIGS. 5 through 8.

At block 910 the UE 115 may determine that a bandwidth capability of the wireless device supports communicating on the first frequency band and at least a second frequency band. The operations of block 910 may be performed according to the methods described with reference to FIGS. 1 through 4. In certain examples, aspects of the operations of block 910 may be performed by a bandwidth capability manager as described with reference to FIGS. 5 through 8.

At block 915 the UE 115 may perform a channel measurement procedure on the first frequency band and the second frequency band concurrently. The operations of block 915 may be performed according to the methods described with reference to FIGS. 1 through 4. In certain examples, aspects of the operations of block 915 may be performed by a channel measurement manager as described with reference to FIGS. 5 through 8.

At block 920 the UE 115 may transmit a channel feedback message comprising information associated with the channel measurement procedure. The operations of block 920 may be performed according to the methods described with reference to FIGS. 1 through 4. In certain examples, aspects of the operations of block 920 may be performed by a channel feedback manager as described with reference to FIGS. 5 through 8, FIG. 10 shows a flowchart illustrating a method 1000 for CQI design for eMTC in accordance with various aspects of the present disclosure. The operations of method 1000 may be implemented by a UE 115 or its components as described herein. For example, the operations of method 1000 may be performed by a CQI manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1005 the UE 115 may monitor, by a wireless device, a first control channel in a first frequency band. The operations of block 1005 may be performed according to the methods described with reference to FIGS. 1 through 4. In certain examples, aspects of the operations of block 1005 may be performed by a control channel monitoring manager as described with reference to FIGS. 5 through 8.

At block 1010 the UE 115 may determine that a bandwidth capability of the wireless device supports communicating on the first frequency band and at least a second frequency band. The operations of block 1010 may be performed according to the methods described with reference to FIGS. 1 through 4. In certain examples, aspects of the operations of block 1010 may be performed by a bandwidth capability manager as described with reference to FIGS. 5 through 8.

At block 1015 the UE 115 may autonomously determine, by the wireless device, to perform the channel measurement procedure on the first frequency band and the second frequency band. The operations of block 1015 may be performed according to the methods described with reference to FIGS. 1 through 4. In certain examples, aspects of the operations of block 1015 may be performed by a channel measurement manager as described with reference to FIGS. 5 through 8.

At block 1020 the UE 115 may perform a channel measurement procedure on the first frequency band and the second frequency band concurrently. The operations of block 1020 may be performed according to the methods described with reference to FIGS. 1 through 4. In certain examples, aspects of the operations of block 1020 may be performed by a channel measurement manager as described with reference to FIGS. 5 through 8.

At block 1025 the UE 115 may transmit a channel feedback message comprising information associated with the channel measurement procedure. The operations of block 1025 may be performed according to the methods described with reference to FIGS. 1 through 4. In certain examples, aspects of the operations of block 1025 may be performed by a channel feedback manager as described with reference to FIGS. 5 through 8.

Figure 11:
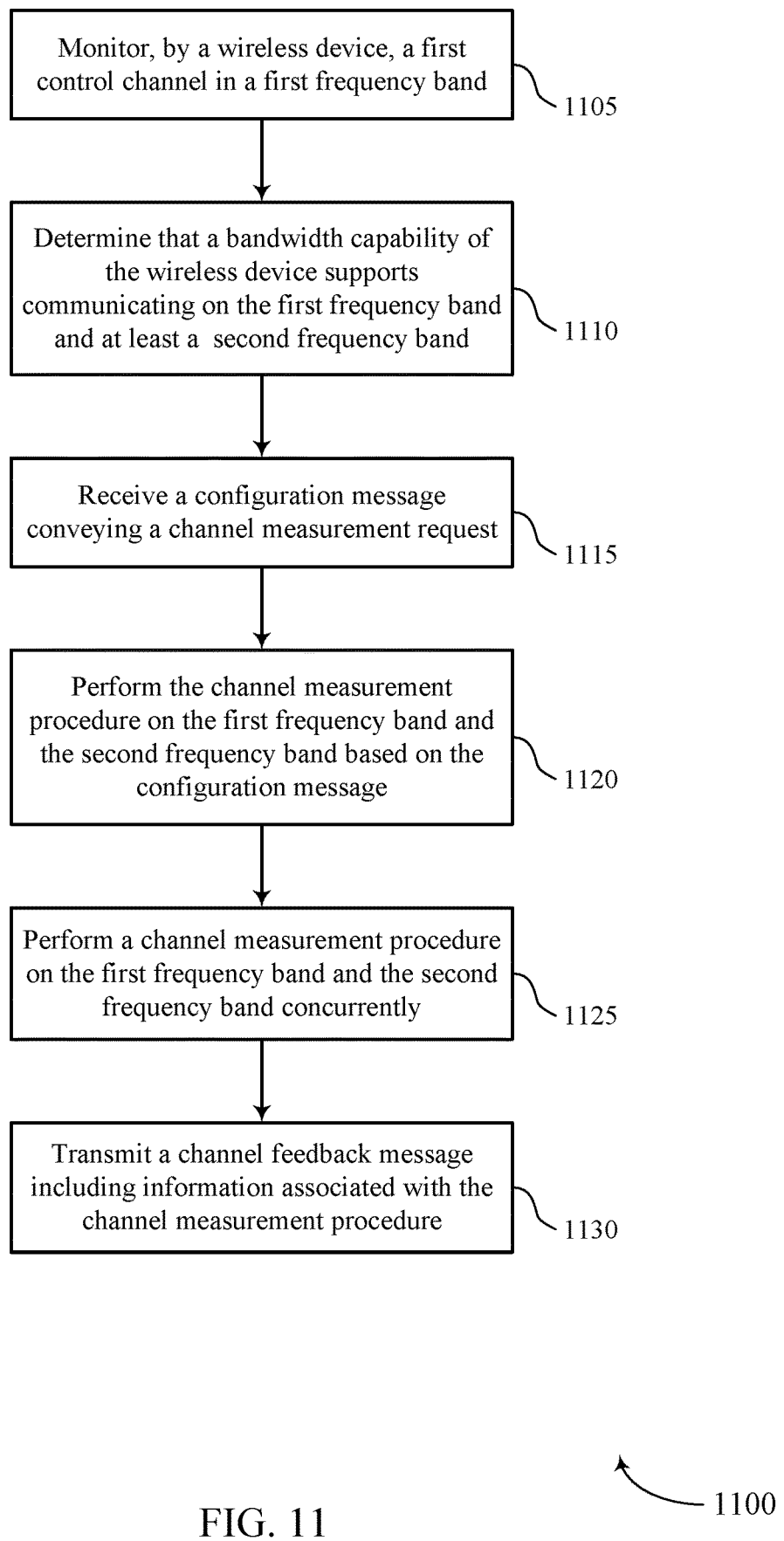
Figure 12:
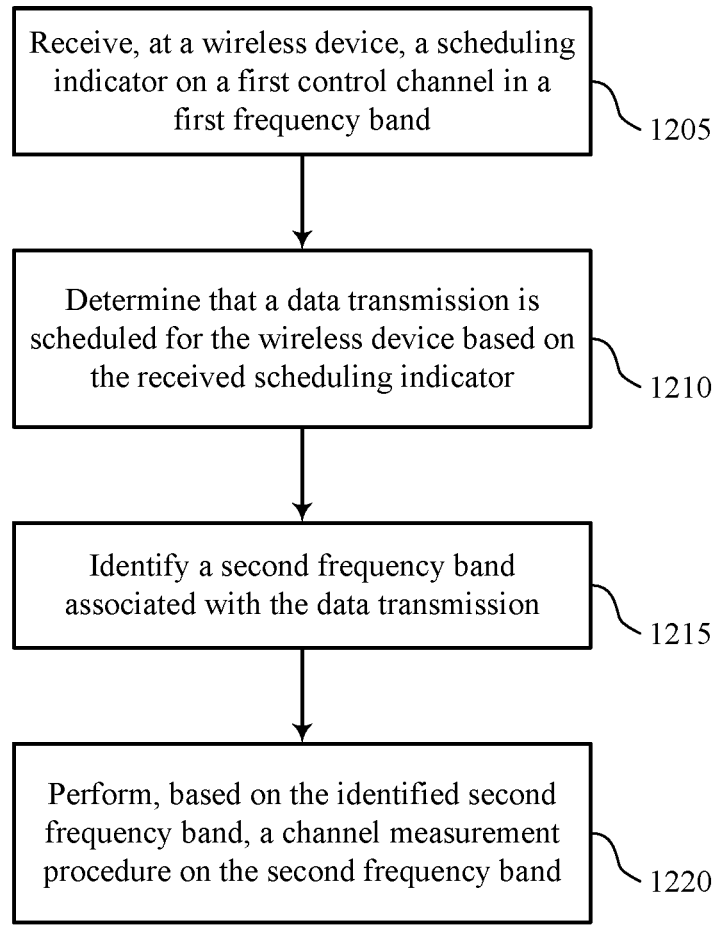

FIG. 11 shows a flowchart illustrating a method 1100 for CQI design for eMTC in accordance with various aspects of the present disclosure. The operations of method 1100 may be implemented by a UE 115 or its components as described herein. For example, the operations of method 1100 may be performed by a CQI manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1105 the UE 115 may monitor, by a wireless device, a first control channel in a first frequency band. The operations of block 1105 may be performed according to the methods described with reference to FIGS. 1 through 4. In certain examples, aspects of the operations of block 1105 may be performed by a control channel monitoring manager as described with reference to FIGS. 5 through 8.

At block 1110 the UE 115 may determine that a bandwidth capability of the wireless device supports communicating on the first frequency band and at least a second frequency band. The operations of block 1110 may be performed according to the methods described with reference to FIGS. 1 through 4. In certain examples, aspects of the operations of block 1110 may be performed by a bandwidth capability manager as described with reference to FIGS. 5 through 8.

At block 1115 the UE 115 may receive a configuration message conveying a channel measurement request. The operations of block 1115 may be performed according to the methods described with reference to FIGS. 1 through 4. In certain examples, aspects of the operations of block 1115 may be performed by a channel measurement manager as described with reference to FIGS. 5 through 8.

At block 1120 the UE 115 may perform the channel measurement procedure on the first frequency hand and the second frequency hand based at least in part on the configuration message. The operations of block 1120 may be performed according to the methods described with reference to FIGS. 1 through 4. In certain examples, aspects of the operations of block 1120 may be performed by a channel measurement manager as described with reference to FIGS. 5 through 8.

At block 1125 the UE 115 may perform a channel measurement procedure on the first frequency band and the second frequency band concurrently. The operations of block 1125 may be performed according to the methods described with reference to FIGS. 1 through 4. In certain examples, aspects of the operations of block 1125 may be performed by a channel measurement manager as described with reference to FIGS. 5 through 8.

At block 1130 the UE 115 may transmit a channel feedback message comprising information associated with the channel measurement procedure. The operations of block 1130 may be performed according to the methods described with reference to FIGS. 1 through 4. In certain examples, aspects of the operations of block 1130 may be performed by a channel feedback manager as described with reference to FIGS. 5 through 8, FIG. 12 shows a flowchart illustrating a method 1200 for CQI design for eMTC in accordance with various aspects of the present disclosure. The operations of method 1200 may be implemented by a UE 115 or its components as described herein. For example, the operations of method 1200 may be performed by a CQI manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1205 the UE 115 may receive, at a wireless device, a scheduling indicator on a first control channel in a first frequency band. The operations of block 1205 may be performed according to the methods described with reference to FIGS. 1 through 4. In certain examples, aspects of the operations of block 1205 may be performed by a control channel monitoring manager as described with reference to FIGS. 5 through 8.

At block 1210 the UE 115 may determine that a data transmission is scheduled for the wireless device based at least in part on the received scheduling indicator. The operations of block 1210 may be performed according to the methods described with reference to FIGS. 1 through 4. In certain examples, aspects of the operations of block 1210 may be performed by a data transmission manager as described with reference to FIGS. 5 through 8.

At block 1215 the UE 115 may identify a second frequency band associated with the data transmission. The operations of block 1215 may be performed according to the methods described with reference to FIGS. 1 through 4. In certain examples, aspects of the operations of block 1215 may be performed by a bandwidth capability manager as described with reference to FIGS. 5 through 8.

At block 1220 the UE 115 may perform, based at least in part on the identified second frequency band, a channel measurement procedure on the second frequency band. The operations of block 1220 may be performed according to the methods described with reference to FIGS. 1 through 4. In certain examples, aspects of the operations of block 1220 may be performed by a channel measurement manager as described with reference to FIGS. 5 through 8.

Figure 13:
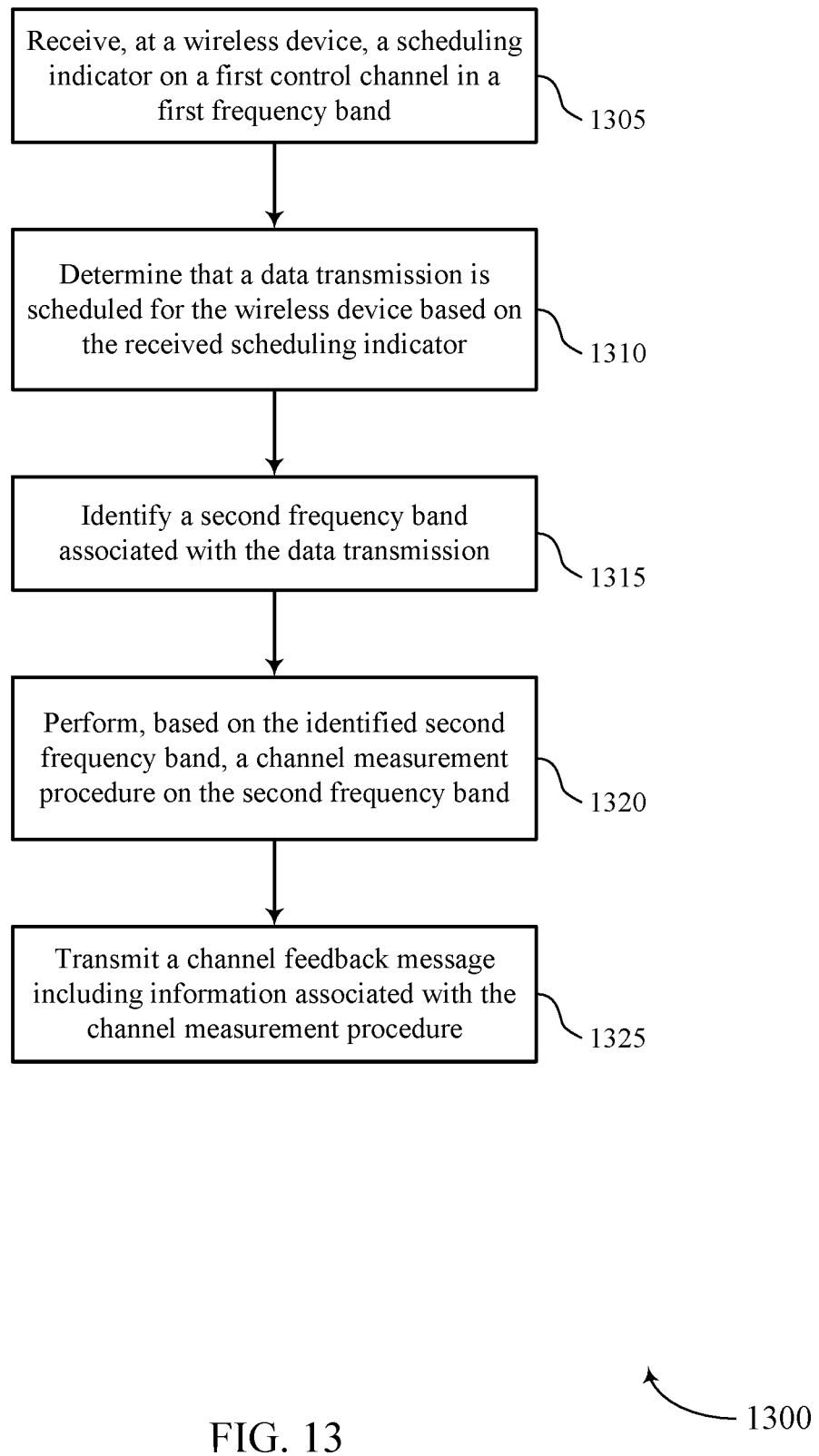

FIG. 13 shows a flowchart illustrating a method 1300 for CQI design for eMTC in accordance with various aspects of the present disclosure. The operations of method 1300 may be implemented by a UE 115 or its components as described herein. For example, the operations of method 1300 may be performed by a CQI manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may receive, at a wireless device, a scheduling indicator on a first control channel in a first frequency band. The operations of block 1305 may be performed according to the methods described with reference to FIGS. 1 through 4. In certain examples, aspects of the operations of block 1305 may be performed by a control channel monitoring manager as described with reference to FIGS. 5 through 8.

At block 1310 the UE 115 may determine that a data transmission is scheduled for the wireless device based at least in part on the received scheduling indicator. The operations of block 1310 may be performed according to the methods described with reference to FIGS. 1 through 4. In certain examples, aspects of the operations of block 1310 may be performed by a data transmission manager as described with reference to FIGS. 5 through 8.

At block 1315 the UE 115 may identify a second frequency band associated with the data transmission. The operations of block 1315 may be performed according to the methods described with reference to FIGS. 1 through 4. In certain examples, aspects of the operations of block 1315 may be performed by a bandwidth capability manager as described with reference to FIGS. 5 through 8.

At block 1320 the UE 115 may perform, based at least in part on the identified second frequency band, a channel measurement procedure on the second frequency band. The operations of block 1320 may be performed according to the methods described with reference to FIGS. 1 through 4. In certain examples, aspects of the operations of block 1320 may be performed by a channel measurement manager as described with reference to FIGS. 5 through 8.

At block 1325 the UE 115 may transmit a channel feedback message comprising information associated with the channel measurement procedure. The operations of block 1325 may be performed according to the methods described with reference to FIGS. 1 through 4. In certain examples, aspects of the operations of block 1325 may be performed by a channel feedback manager as described with reference to FIGS. 5 through 8.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communication systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc, IS-856 (TIA-856) is commonly referred to as CDMA2000 1xEV-DO. High Rate Packet Data (HRPD), etc, UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB). Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of Universal Mobile Telecommunications System (UMTS) that use E-UTRA. UTRA, E-UTRA, UNITS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communication system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communication system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having art association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communication system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DST), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
monitoring, by a wireless device, a first control channel in a first frequency band, wherein the wireless device is configured to perform channel measurement and reporting on the first frequency band;
determining that a bandwidth capability of the wireless device supports communicating on the first frequency band and at least a second frequency band, wherein the second frequency band includes at least one frequency band not included in the first frequency band, wherein the wireless device is not configured by a network entity to perform channel measurement and reporting on the at least one frequency band;
performing a channel measurement procedure on the first frequency band and the at least one frequency band of the second frequency band concurrently; and
transmitting a channel feedback message comprising information associated with the channel measurement procedure.

2. The method of claim 1, further comprising:
autonomously determining, by the wireless device, to perform the channel measurement procedure on the first frequency band and the at least one frequency band of the second frequency band.

3. The method of claim 1, further comprising:
receiving a configuration message conveying a channel measurement request; and
performing the channel measurement procedure on the first frequency band and the at least one frequency band of the second frequency band based at least in part on the configuration message.

4. The method of claim 1, further comprising:
identifying a portion of subframes from a plurality of subframes to perform the channel measurement procedure; and
performing the channel measurement procedure on the first frequency band and the at least one frequency band of the second frequency band during the identified portion of subframes.

5. The method of claim 1, further comprising:
identifying a preconfigured set of frequency bands, wherein the first frequency band and at least one frequency band of the second frequency bands are included in the preconfigured set of frequency bands.

6. The method of claim 1, wherein:
the channel feedback message comprises one or more of a full bandwidth channel quality indicator (CQI), a best bandwidth indicator, a bandwidth differential, CQI, a subband report, a precoding matrix indicator (PMI), or combinations thereof.

7. The method of claim 1, further comprising:
increasing a number of bits in channel feedback message to carry the contents of the channel feedback message.

8. The method of claim 1, further comprising:
determining a set of wideband frequency bands associated with the wireless device monitoring a control channel; and
selecting the first frequency band and at least one frequency band of the second frequency bands that are within the wideband frequency bands.

9. The method of claim 1, wherein:
the channel measurement procedure is performed according to a periodic schedule or an aperiodic schedule.

10. The method of claim 1, wherein:
the first frequency band comprises a 1.4 megahertz (MHz) bandwidth.

11. The method of claim 1, wherein:
the bandwidth associated with the second frequency band comprises one of a 5 megahertz (MHz) bandwidth or a 20 MHz bandwidth.

12. An apparatus for wireless communication comprising:
means for monitoring, by the apparatus, a first control channel in a first frequency band, wherein the apparatus is configured to perform channel measurement and reporting on the first frequency band;
means for determining that a bandwidth capability of the apparatus supports communicating on the first frequency band and at least a second frequency band, wherein the second frequency band includes at least one frequency band not included in the first frequency band, wherein the apparatus is not configured by a network entity to perform channel measurement and reporting on the at least one frequency band;
means for performing a channel measurement procedure on the first frequency band and the at least one frequency band of the second frequency band concurrently; and
means for transmitting a channel feedback message comprising information associated with the channel measurement procedure.

13. The apparatus of claim 12, further comprising:
means for autonomously determining, by the apparatus, to perform the channel measurement procedure on the first frequency band and the at least one frequency band of the second frequency band.

14. The apparatus of claim 12, further comprising:
means for receiving a configuration message conveying a channel measurement request; and
means for performing the channel measurement procedure on the first frequency band and the at least one frequency band of the second frequency band based at least in part on the configuration message.

15. The apparatus of claim 12, further comprising:
means for identifying a portion of subframes from a plurality of subframes to perform the channel measurement procedure; and means for performing the channel measurement procedure on the first frequency band and the at least one frequency band of the second frequency band during the identified portion of subframes.

16. The apparatus of claim 12, further comprising:
means for identifying a preconfigured set of frequency bands, wherein first frequency band and at least one frequency band of the second frequency bands are included in the preconfigured set of frequency bands.

17. The apparatus of claim 12, wherein:
the channel feedback message comprises one or more of a full bandwidth channel quality indicator (CQI), a best bandwidth indicator, a bandwidth differential, CQI, a subband report, a precoding matrix indicator (PMI), or combinations thereof.

18. The apparatus of claim 12, further comprising:
means for increasing a number of bits in channel feedback message to carry the contents of the channel feedback message.

19. The apparatus of claim 12, further comprising:
means for determining a set of wideband frequency bands associated with the apparatus monitoring a control channel; and
means for selecting the first frequency band and at least one frequency band of the second frequency bands that are within the wideband frequency bands.

20. The apparatus of claim 12, wherein:
the channel measurement procedure is performed according to a periodic schedule or an aperiodic schedule.

21. The apparatus of claim 12, wherein:
the first frequency band comprises a 1.4 megahertz (MHz) bandwidth.

22. The apparatus of claim 12, wherein:
the bandwidth associated with the second frequency band comprises one of a 5 megahertz (MHz) bandwidth or a 20 MHz bandwidth.

23. An apparatus for wireless communication, comprising:
a processor;
memory in electronic communication with the processor; and
instructions stored in the memory and executable by the processor to cause the apparatus to:
monitor a first control channel in a first frequency band, wherein the apparatus is configured to perform channel measurement and reporting on the first frequency band;
determine that a bandwidth capability of the apparatus supports communicating on the first frequency band and at least a second frequency band, wherein the second frequency band includes at least one frequency band not included in the first frequency band, wherein the apparatus is not configured by a network entity to perform channel measurement and reporting on the at least one frequency band;
perform a channel measurement procedure on the first frequency band and the at least one frequency band of the second frequency band concurrently; and
transmit a channel feedback message comprising information associated with the channel measurement procedure.

24. The apparatus of claim 23, wherein the instructions are further executable by the processor to cause the apparatus to:
autonomously determine to perform the channel measurement procedure on the first frequency band and the at least one frequency band of the second frequency band.

25. The apparatus of claim 23, wherein the instructions are further executable by the processor to cause the apparatus to:
receive a configuration message conveying a channel measurement request; and
perform the channel measurement procedure on the first frequency band and the at least one frequency band of the second frequency band based at least in part on the configuration message.

26. The apparatus of claim 23, wherein the instructions are further executable by the processor to cause the apparatus to:
identify a portion of subframes from a plurality of subframes to perform the channel measurement procedure; and
perform the channel measurement procedure on the first frequency band and the at least one frequency band of the second frequency band during the identified portion of subframes.

27. The apparatus of claim 23, wherein the instructions are further executable by the processor to cause the apparatus to:
identify a preconfigured set of frequency bands, wherein first frequency band and at least one frequency band of the second frequency bands are included in the preconfigured set of frequency bands.

28. The apparatus of claim 23, wherein:
the channel feedback message comprises one or more of a full bandwidth channel quality indicator (CQI), a best bandwidth indicator, a bandwidth differential, CQI, a subband report, a precoding matrix indicator (PMI), or combinations thereof.

29. The apparatus of claim 23, wherein the instructions are further executable by the processor to cause the apparatus to:
increase a number of bits in channel feedback message to carry the contents of the channel feedback message.

30. The apparatus of claim 23, wherein the instructions are further executable by the processor to cause the apparatus to:
determine a set of wideband frequency bands associated with the wireless device monitoring a control channel; and
select the first frequency band and at least one frequency band of the second frequency bands that are within the wideband frequency bands.

31. The apparatus of claim 23, wherein:
the channel measurement procedure is performed according to a periodic schedule or an aperiodic schedule.

32. The apparatus of claim 23, wherein:
the first frequency band comprises a 1.4 megahertz (MHz) bandwidth.

33. The apparatus of claim 23, wherein:
the bandwidth associated with the second frequency band comprises one of a 5 megahertz (MHz) bandwidth or a 20 MHz bandwidth.

34. An non-transitory computer readable medium for wireless communication comprising instructions operable to cause a processor to:
monitor, by a wireless device, a first control channel in a first frequency band wherein the wireless device is configured to perform channel measurement and reporting on the first frequency band;
determine that a bandwidth capability of the wireless device supports communicating on the first frequency band and at least a second frequency band, wherein the second frequency band includes at least one frequency band not included in the first frequency band, wherein the wireless device is not configured by a network entity to perform channel measurement and reporting on the at least one frequency band;

perform a channel measurement procedure on the first frequency band and the at least one frequency band of the second frequency band concurrently; and transmit a channel feedback message comprising information associated with the channel measurement procedure.

* * * * *